(12) United States Patent
Innes

(10) Patent No.: US 11,311,920 B2
(45) Date of Patent: Apr. 26, 2022

(54) PROGRAMMABLE RAILCAR TANK CLEANING SYSTEM

(71) Applicant: AGI Engineering, Inc., Stockton, CA (US)

(72) Inventor: Alex G. Innes, Lodi, CA (US)

(73) Assignee: AGI Engineering, Inc., Stockton, CA (US)

( * ) Notice: Subject to any disclaimer, the term of this patent is extended or adjusted under 35 U.S.C. 154(b) by 153 days.

(21) Appl. No.: 16/437,796

(22) Filed: Jun. 11, 2019

(65) Prior Publication Data

US 2019/0374984 A1 Dec. 12, 2019

Related U.S. Application Data

(60) Provisional application No. 62/784,512, filed on Dec. 23, 2018, provisional application No. 62/683,215, filed on Jun. 11, 2018.

(51) Int. Cl.
*B08B 9/46* (2006.01)
*B61K 11/00* (2006.01)
(Continued)

(52) U.S. Cl.
CPC .............. *B08B 9/46* (2013.01); *B08B 9/0813* (2013.01); *B61K 11/00* (2013.01); *B08B 2209/08* (2013.01); *B61D 5/00* (2013.01)

(58) Field of Classification Search
CPC ..... B08B 9/46; B08B 9/0813; B08B 2209/08; B61K 11/00; B61D 5/00
(Continued)

(56) References Cited

U.S. PATENT DOCUMENTS 1,611,326 A 12/1926 Abbe
2,461,433 A 2/1949 Moulten et al.
(Continued)

FOREIGN PATENT DOCUMENTS

EP 1166903 1/2002
EP 3151246 A1 4/2017
(Continued)

OTHER PUBLICATIONS

Pearson, M.J., et al., "Biomimetic Vibrissal Sensing for Robots," Philosophical Transactions of the Royal Society B (2011), vol. 366, pp. 3085-3096, 12 pages.
(Continued)

*Primary Examiner* — Tinsae B Ayalew
(74) *Attorney, Agent, or Firm* — Brian S. Steinberger; Hilary F. Steinberger; Law Offices of Brian S. Steinberger, P.A.

(57) ABSTRACT

Systems, devices, and methods for passing railcar tank cleaning systems through the opening and mounted to existing manways. The invention can extend horizontally more than 25 feet and clean rail cars up to and beyond approximately 102 inches in diameter for manual, automated, or semi-automated programmable railcar tank cleaning systems, devices and methods for providing safe and efficient methods for breaking up oil, tar, chemical, radioactive, hazardous, or any other liquid, solid, or sludge waste inside rail tank cars and the like with nozzles which utilize fluid jets to break up, liquefy, and motivate tank material. The programmable railcar cleaning system can be a standalone, independent unit or integrated into new designs and/or existing systems. Simplified programming and user interface allow an operator to remotely operate the system. The various capabilities of this invention allow cleaning in a quicker and more efficient manner. The system is hydrau-
(Continued)

lically controlled and can work in the presence of flammable vapors and dust.

12 Claims, 20 Drawing Sheets

(51) Int. Cl.
    *B08B 9/08*     (2006.01)
    *B61D 5/00*     (2006.01)

(58) Field of Classification Search
    USPC .......................................................... 134/113
    See application file for complete search history.

(56) References Cited

U.S. PATENT DOCUMENTS

| | | |
|---|---|---|
| 2,611,523 A | 9/1952 | Aines |
| 2,668,625 A | 2/1954 | Garland |
| 2,669,941 A | 2/1954 | Stafford |
| 2,682,886 A | 7/1954 | Paxton |
| 2,761,297 A | 9/1956 | Buchsteiner |
| 2,819,803 A | 1/1958 | Obenchain |
| 2,833,422 A | 5/1958 | Ferwerda et al. |
| 2,985,192 A | 5/1961 | Taylor et al. |
| 2,999,600 A | 9/1961 | Gates |
| 3,060,972 A | 10/1962 | Sheldon |
| 3,095,044 A | 6/1963 | Medlock |
| 3,116,021 A | 12/1963 | Born |
| 3,155,048 A | 11/1964 | Mandelbaum et al. |
| 3,161,490 A | 12/1964 | Dudek |
| 3,162,214 A | 12/1964 | Bazinet, Jr. |
| 3,190,286 A | 6/1965 | Stokes |
| 3,266,059 A | 8/1966 | Stelle |
| 3,274,850 A | 9/1966 | Tascio |
| 3,305,220 A | 2/1967 | Nevulis |
| 3,469,712 A | 9/1969 | Haulotte |
| 3,497,083 A | 2/1970 | Anderson et al. |
| 3,580,099 A | 5/1971 | Mosher |
| 3,599,871 A | 8/1971 | Ruppel |
| 3,757,697 A | 9/1973 | Phinney |
| 3,788,338 A | 1/1974 | Burns |
| 3,845,596 A | 11/1974 | Veenstra |
| 3,863,844 A | 2/1975 | McMillan |
| 3,889,818 A | 6/1975 | Wennerstrom |
| 3,932,065 A | 1/1976 | Ginsberg et al. |
| 3,951,572 A | 4/1976 | Ray, Jr. et al. |
| 4,106,671 A | 8/1978 | Sharples |
| 4,132,041 A | 1/1979 | Van Den Broek |
| 4,156,331 A | 5/1979 | Lester et al. |
| 4,250,933 A | 2/1981 | Olson |
| 4,339,232 A | 7/1982 | Campbell |
| 4,393,798 A | 7/1983 | Larson et al. |
| 4,396,093 A | 8/1983 | Zimmerman |
| 4,415,297 A | 11/1983 | Boring |
| 4,494,417 A | 1/1985 | Larson et al. |
| 4,540,869 A | 9/1985 | Yasuoka |
| 4,630,741 A | 12/1986 | Stevens |
| 4,661,039 A | 4/1987 | Brenholt |
| 4,685,349 A | 8/1987 | Wada et al. |
| 4,817,653 A | 4/1989 | Krajicek et al. |
| 4,828,461 A | 5/1989 | Laempe |
| 4,848,179 A | 7/1989 | Ubhayakar |
| 4,944,535 A | 7/1990 | Maupin |
| 4,945,955 A | 8/1990 | Murphy |
| 4,977,790 A | 12/1990 | Nishi et al. |
| 5,007,803 A | 4/1991 | DiVito et al. |
| D326,336 S | 5/1992 | Christ |
| 5,172,710 A | 12/1992 | Harrington |
| 5,174,168 A | 12/1992 | Takagi et al. |
| 5,297,443 A | 3/1994 | Wentz |
| 5,439,020 A | 8/1995 | Lockhart |
| 5,451,135 A | 9/1995 | Schempf et al. |
| 5,515,654 A | 5/1996 | Anderson |
| 5,518,553 A * | 5/1996 | Moulder ............... B08B 9/0936 134/167 R |
| 5,540,172 A | 7/1996 | Goldbach et al. |
| 5,607,000 A | 3/1997 | Cripe et al. |
| 5,715,852 A | 2/1998 | Jepsen |
| 5,740,821 A | 4/1998 | Arnold |
| 5,913,320 A | 6/1999 | Varrin, Jr. et al. |
| 6,213,134 B1 | 4/2001 | Pike |
| 6,213,135 B1 | 4/2001 | Moulder |
| 6,264,434 B1 | 7/2001 | Frank |
| 6,273,790 B1 | 8/2001 | Neese et al. |
| 6,280,408 B1 | 8/2001 | Sipin |
| 6,561,368 B1 | 5/2003 | Sturm, Jr. et al. |
| 6,651,837 B2 | 11/2003 | Stradinger et al. |
| 6,830,079 B1 | 12/2004 | Ahrens et al. |
| 6,889,920 B2 | 5/2005 | Nance et al. |
| 6,938,691 B2 | 9/2005 | Face |
| 7,021,675 B2 | 4/2006 | Lawson |
| 7,032,628 B2 | 4/2006 | Guillemette et al. |
| 7,100,631 B2 | 9/2006 | Liu et al. |
| 7,241,080 B2 | 7/2007 | Klobucar et al. |
| 7,708,504 B2 | 5/2010 | Heckendorn et al. |
| 7,998,251 B2 | 8/2011 | Pondelick et al. |
| 8,069,747 B2 | 12/2011 | Buckingham et al. |
| 8,205,522 B2 | 6/2012 | Buckingham et al. |
| 8,347,563 B2 | 1/2013 | Anderson |
| 8,414,246 B2 | 4/2013 | Tobey |
| 8,702,399 B2 | 4/2014 | Krohn |
| 8,727,671 B2 | 5/2014 | Sundholm |
| 8,763,855 B1 | 7/2014 | Harvey et al. |
| 8,840,087 B2 | 9/2014 | Guyard |
| 9,195,238 B2 | 11/2015 | Roden et al. |
| 10,280,063 B2 | 5/2019 | Innes et al. |
| 10,406,571 B2 | 9/2019 | Innes et al. |
| 2002/0002426 A1 | 1/2002 | Burkhard |
| 2005/0025573 A1 | 2/2005 | Waldman et al. |
| 2005/0109376 A1 | 5/2005 | Gregory |
| 2005/0166413 A1 | 8/2005 | Crampton |
| 2006/0054189 A1 | 3/2006 | Luke et al. |
| 2006/0054202 A1 | 3/2006 | Luke et al. |
| 2008/0148876 A1 | 6/2008 | Hock et al. |
| 2010/0221125 A1 | 9/2010 | Fulkerson et al. |
| 2010/0234988 A1 | 9/2010 | Buckingham et al. |
| 2010/0264013 A1 | 10/2010 | Burton |
| 2011/0186657 A1 | 8/2011 | Haviland |
| 2011/0315165 A1 | 12/2011 | McWhorter |
| 2012/0106882 A1 | 5/2012 | Ponnouradjou et al. |
| 2012/0279537 A1 | 11/2012 | Peeters et al. |
| 2014/0079573 A1 | 3/2014 | Pabst |
| 2015/0034176 A1 | 2/2015 | Garcia Arguelles et al. |
| 2015/0124242 A1 | 5/2015 | Pierce et al. |
| 2015/0362000 A1 | 12/2015 | Schmidt et al. |
| 2016/0055268 A1 | 2/2016 | Bell et al. |
| 2016/0107207 A1 | 4/2016 | Desormeaux |
| 2017/0120442 A1 | 5/2017 | Frei et al. |
| 2017/0173617 A1 | 6/2017 | Zilai et al. |
| 2017/0259309 A1 | 9/2017 | Innes et al. |

FOREIGN PATENT DOCUMENTS

| | | |
|---|---|---|
| IN | 201741036558 A | 10/2017 |
| JP | 2004301665 A | 10/2004 |
| WO | 2009018599 | 2/2009 |
| WO | 2014019852 A1 | 2/2014 |

OTHER PUBLICATIONS

Innes, Alex. G., PCT Patent Application No. PCT/US/19/068359, filed Dec. 23, 2019, Notification of Transmittal of the International Search Report and the Written Opinion of the International Search Authority, or the Declaration dated Feb. 25, 2020, 14 pages.

Bullseye Pumps, Bullseye B200-SPDK Vacuum Loading Solids Pump, 2017, retrieved from http://www.bullseyepumps.com/products/bullseye-b200-spdk-vacuum-loading-solids-pump?variant31478670788, 10 pages.

Sykes Pumps, General Purpose, GP50 Pump Perfomance, 2017, retrieved from http://www.sykespumps.com.sa/pumps/product-specs/gp_50_75.html, 2 pages.

(56) References Cited

OTHER PUBLICATIONS

Pentair Southern Cross, SX60 Portable Slurry Pump, 2017, retrieved from http://www.southerncross.pentair.com.au/product/market/pumps/vacuum-pumps/sx60-portable-slurry-pump/, 3 pages.
Wastecorp. Pumps, Super Duty, TVP-65 Series Vacuum Pumps, 2017, brochure, 1 page.
RITCHIESpecs, Gradall 534D-9-45 Telescopic Forklift, 2017, retrieved from wew.ritchiespecs.com, 2 pages.
Boom, Gradall Material Handler 534 D-6/534 D-6 Turbo. Jul. 2002, 1 page.
Manitowoc, National Crane 600H Series Product Guide, 2012, 16 pages.
Manitowoc, National Crane 680H-TM, Aug. 2015, 4 pages.
Festo, Bionic Handling Assistant, Apr. 2012, 6 pages.
Schutz, Maxon Motor, Robotic Snake-Arm Flies into Tight Spaces, 2012, 4 pages.
McMahan, W., et al., Field Trials and Testing of the OctArm Continuum Manipulator, IEEE, May 2006, pp. 2336-2341, 6 pages.
Li, Z., et al., A Novel Tele-Operated Flexible Robot Targeted for Minimally Invasive Robotic Surgery, Engineering Research Robotics Article, Mar. 2015, pp. 073-078, vol. 1, issue 1, 6 pages.
Li, Z., et al., Kinematic Comparison of Surgical Tendon-Driven Manipulators and Concentric Tube Manipulators, Mechanism and Machine Theory, 2017, pp. 148-165, vol. 107, 18 pages.
Military Elevation Solutions and Tactical Trailers, KVL and KVR Telescopic Cable-Drive Masts, Sep. 2016, 3 pages.
OCRobotics, Laser Snake 2, Snake-arm robot and high-power laser integration, www.ocrobotics.com, 2016, 4 pages.
OCRobotics, Nuclear decommissioning case-study: Laser Snake, Snake-arm robot and high-power laser integration, www.ocrobotics.com, 2016, 4 pages.
Bauer, et al., Development and Deployment of the Extended Reach Sluicing System (ERSS) for Retrieval of Hanford Single Shell Tank Waste—14206 (Draft), U.S. Department of Energy, Assistant Secretary for Environmental Management, Washington River Protection Solutions, Nov. 2013, 19 pages.
Innes, PCT Patent Application No. PCT/US17/18120 filed Feb. 16, 2017, Notification of Tsansmittal of the International Search Report and the Written Opinion of the International Searching Authority, or the Declaration dated May 10, 2017, 14 pages.
Innes, PCT Patent Application No. PCT/US17/18120 filed Feb. 16, 2017, Notification Concerning Transmittal of International Preliminary Report on Patentability, 12 pages.
Oceaneering International, Inc., PCT Patent Application No. PCT/US18/060093, filed Nov. 9, 2018, Notification of Transmittal of the International Search Report and The Written Opinion of the International Searching Authority, or the Declaration dated Feb. 5, 2019, 3 pages.
Innes, Alex. G., PCT Patent Application No. PCT/US/19/036567, filed Jun. 11, 2019, Notification of Transmittal of the International Search Report and the Written Opinion of the International Search Authority, or the Declaration dated Sep. 17, 2019, 7 pages.
Lane, et al. "FY10 Engineering Innovations, Research and Technology Report" In: Lawrence Livermore National Lab. Jan. 31, 2011 (Jan. 31, 2011) Retrieved on Aug. 10, 2019 (Aug. 10, 2019) from https://e-reports-ext.llnl.gov/pdf/461932.pdf, 99 pages.
AGI Engineering, Inc., European Patent Application No. 19819677.6-1017, Extended Supplementary European Search Report, dated Jul. 15, 2021, 8 pages.

* cited by examiner

PROGRAMMABLE RAILCAR TANK CLEANING SYSTEM

CROSS REFERENCE TO RELATED APPLICATIONS

This application is a Continuation-In-Part of U.S. application Ser. No. 15/450,187 filed Mar. 6, 2017, now U.S. Pat. No. 10,406,571 which claims the benefit of priority to U.S. Provisional Patent Application 62/305,233 filed Mar. 8, 2016, and this application claims the benefit of priority to U.S. Provisional Application Ser. No. 62/683,215 filed Jun. 11, 2018, and this application claims the benefit of priority to U.S. Provisional Patent Application 62/784,512 filed Dec. 23, 2018. The entire disclosure of each of the applications listed in this paragraph are incorporated herein by specific reference thereto.

FIELD OF INVENTION

This invention relates to breaking up oil and tar, or any other chemical, or hazardous liquid, solid, or sludge waste from inside railcar tank and the like, and more specifically, to manual, automated, or semi-automated, tank cleaning devices, systems and methods for breaking up oil and tar, or any other chemical, radioactive or hazardous liquid, solid, or sludge waste from inside railcar tanks and the like, with nozzles which utilize fluid jets to break up, liquefy, and motivate tank material. The invention can work with tanks having high temperature or low temperature conditions and tanks having hazardous vapors, dusts, or the like.

BACKGROUND AND PRIOR ART

Railcar tanks used for storage can be cleaned using handheld water nozzles, which is slow, tedious, and inefficient along with having potential danger to those using the water nozzles. Personnel working in these environments would be exposed to hazardous and potentially flammable fluids, dusts and vapors in addition to strenuous conditions due to the requirement of the use of protective gear. Also, this work mostly performed in confined spaces making it cumbersome to use the requisite handheld blast equipment. Handheld blast nozzles produce high velocities and high thrust forces that an operator must counteract. This leads to fatigue and injury.

More sophisticated, remotely controlled systems have been employed but are limited due to visibility. Since the area is dangerous and inaccessible by humans, remotely operated cameras are required. Remotely operated cameras also slow, tedious, and inefficient to use as this only provides a limited viewing area in a dark tank, with limited light, making it difficult for cameras to capture images with adequate detail and contrast. Additionally, mist and airborne particles common in waste storage tanks can obstruct the camera view and render it useless. More challenging is how an operator is required to visually survey the area to determine the appropriate cleaning pattern given the limited visibility of the camera.

Other "Dumb" systems with rotating, oscillating, or self-propelled nozzles have been employed; however, this method cleans everything in its path, 360 degrees, in all directions, whether it needs to be or not. Like where waste only resides in the bottom of a tank. This all or nothing method wastes resources, e.g., water, electricity, etc., and induces extensive cycle times. Also, these systems are a set and go method; so if not set properly, isolated areas requiring more extensive cleaning are left with waste still intact. An operator then has to visually survey the area, reset the parameters, and perform the cleaning operation again.

Also, when a stream of waste is flowing towards the drain, a portion of the liquid and particles can flow past the outlet. Once the stream passes the outlet, a secondary operation must be implemented to properly capture the waste increasing operation costs and the overall time to effectively clean a tank.

Thus, the need exists for solutions to the above problems with the prior art.

The present invention seeks to provide an automated solution that solves the above challenges and reduces overall cycle times.

SUMMARY OF THE INVENTION

A primary objective of the present invention is to provide manual, automated, or semi-automated devices, systems and methods incorporating nozzles which utilize fluid jets to break up and liquefy tank material such as oil and tar, or any other chemical, or hazardous liquid, solid, or sludge waste material in railcar tanks.

Furthermore, the present invention will operate in any tanks containing hazardous vapors, dusts, and the like.

A telescoping robotic arm cleaning system can be mounted in manways of railcar tanks as small as approximately 18 inches in diameter (or less). Nozzles mounted on the end of telescoping arms can utilize fluid jets to break up, liquefy and motivate solids.

Opposing telescoping booms can rotate approximately 90 degrees from vertical to horizontal and extend and retract high and low-pressure nozzle assemblies up to and over approximately 25 feet to reach each end of the railcar tank. The dual, opposing booms allow for the tank to be cleaned from both ends simultaneously, pushing the waste to the center, thus allowing the maximum amount of waste to be collected at the drain outlet during a single cleaning cycle. The nozzle assembly at the distal end of the boom can be twisted and rotated to direct the liquid stream as needed. As the nozzles break and liquefy the waste material, the booms can be incrementality retracted to direct the waste to the drain in the center of the railcar tank.

The nozzle assembly can include a single low pressure, high flow fluid jet operating at pressures up to, but not limited to, approximately 5000 psig at a flow rate ranging from approximately 10 to approximately 500 GPM. In a further embodiment, a high pressure, low flow jet working up to, but not limited to, a pressure range from approximately 5,000 psig to approximately 10,000 psig, at a flow rate range from 0 to approximately 50 GPM can be integrated. In another embodiment, a plurality of high flow, low pressure and high pressure, low flow fluid jets can be incorporated in various combinations and orientations. The fluid jet(s) can be twisted and rotated to direct the liquid stream as needed with two degrees of freedom, transverse and elevation. The first degree of freedom, known as transverse, can be described by approximately 360 degrees of rotation about a longitudinal, horizontal axis. The second degree of freedom, known as elevation, can be described by approximately 360 degrees of rotation of the fluid jet(s) about an axis perpendicular to the longitudinal, horizontal axis.

Each degree of motion is rotated by a hydraulic actuator orientated about its axis. A hydraulic power unit (HPU) provides pressurized fluid to electronically controlled valves which in turn modulates fluid flow to the actuators. The valves can be, but not limited to, servo valves or servo-proportional valves and are mounted on a manifold. The HPU can include, but not limited to, the requisite hydraulic pump driven by an electric motor to supply the system with flow and pressure of hydraulic fluid from an integrated storage reservoir. Supply and return hoses connect between the hydraulic power unit and the hydraulic manifold. The hydraulic manifold can be, but not limited to, a block of steel or stainless steel machined with varying passageways to distribute hydraulic fluid to a plurality of valves mounted along the surfaces of the block. Mounted on the manifold frame, a control panel enclosure houses a motion controller that sends and receives inputs and outputs (I/O) in order to control the above valves.

In the preferred embodiment, a hydraulic valve manifold and control station can reside as close as possible to the tank but out of any classified hazardous area. In one embodiment, the hydraulic valve manifold and control station can be equipped with explosion proof or intrinsically safe components allowing operation in a classified hazardous zone where flammable gases or dust can exist. In an additional embodiment, the invention can be operated from a remote console station up to approximately 1000 feet (or more) away. The control station can include, but not limited to, a human machine interface (HMI) housed in an enclosure rated for outdoor operation. The HMI can include, but is not limited to, software, display screen, keyboard, pushbuttons, switches, and joysticks used to control and interact with the nozzle assembly. The HMI will allow an operator to monitor and manipulate the process in real-time. Also, as the programmable railcar tank cleaning system is processing one section, an operator can sit at the HMI and develop the toolpath or program for the next process. Manual manipulation can be done remotely at the human machine interface (HMI) in conjunction with cameras and pointers. In a further embodiment, the nozzle assembly can be manipulated by an operator through controls on a handheld remote control.

In a preferred embodiment, the device uses hydraulic power to manipulate nozzle assembly providing safe operation in environments with flammable vapors or dusts. Another embodiment of the device would use explosion proof linear actuator and/or electric motors to manipulate the nozzle assembly. The motors and actuators would be powered by cables coming from the device within the tank section being cleaned to an electrical motion controller and power supply residing in the control station located outside the classified hazardous area.

Automatic manipulation can be achieved through predetermined motion profiles that are calculated through software using kinematic algorithms. These profiles are interpolated around selected features, surface profiles or areas in the tank.

Using cameras, pointers, distance sensors, and a remote controller, the nozzle assembly can be positioned at specific points relative to the work. By establishing multiple points around a feature or set of features, a list of coordinates can be generated. The remote controller can be, but is not limited to, a handheld box containing the appropriate buttons, switches, and joysticks to control the nozzle from any location. The camera can be integrated into the nozzle assembly and can include, but is not limited to, industrial grade monochromatic or color camera with lighting capable of transmitting a high resolution, live image to a remote screen. In further embodiments, the camera and/or lighting can be intrinsically safe or explosion proof. Features of the camera can include pan, tilt, and zoom. The laser pointer can be, but is not limited to, a device mounted to nozzle assembly capable of projecting a visible dot on a surface of a tank indicating the line of sight of the end effector.

The distance sensors can include, but are not limited to, ultrasound, radiofrequency or laser such as a time-of-flight laser sensor that transmits light at a surface. The sensor can then determine the amount of time it takes (time-of-flight) to receive the light reflected off said surface. Using the known speed of light, the sensor can calculate the relative distance.

Dedicated software can draw lines or curves from point to point in such a way to form basic geometries such as squares, rectangles, circles, and so forth. These lines provide a map to be used as path, i.e. toolpaths that the nozzle assembly can follow as programmed.

A controller takes this data and outputs the command signals to corresponding servo valves or servo-proportional valves; therefore, synchronizing the multiple axes and effectively moving the nozzle assembly along the desired path. The controller will also sequence events as needed.

Servo valves can be, but are not limited to, a valve that uses analog electrical signals ranging from, but not limited to, 0 to approximately 100 milliamps to modulate a spool to precisely control hydraulic fluid flow to a hydraulic cylinder or motor. A servo-proportional valve can be, but is not limited to, a valve that operates on the same principal as a servo valve, but is constructed with looser tolerances and operates with less precision. Servo-proportional valves can also operate on analog electrical signals ranging from, but not limited to, 0 to approximately 100 milliamps as well as voltage signals ranging from, but not limited to, +/−approximately 40 VDC.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1A:
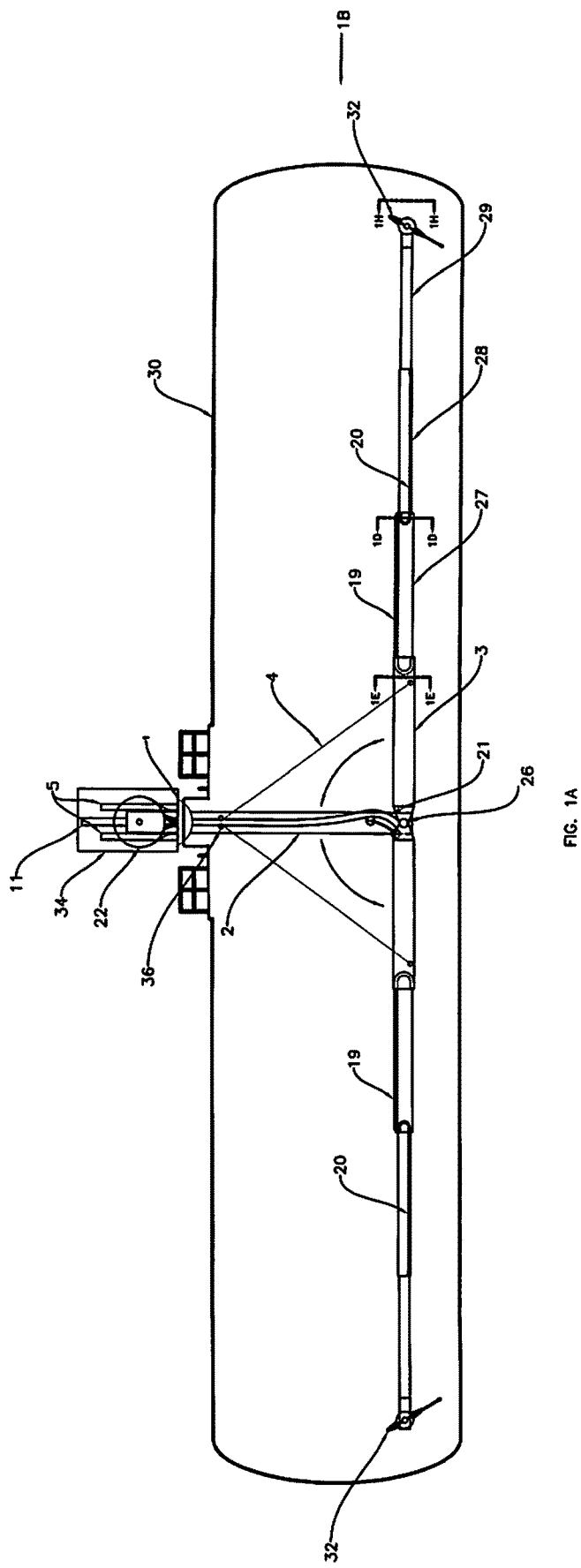
FIG. 1A is front section of the Programmable Railcar Tank Cleaning System mounted in a typical railcar.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The term low pressure/high flow can be defined as, but not limited to, a pressure between approximately 1 psig and up to approximately 5000 psig at a flow rate ranging between approximately 0.5 gpm and up to approximately 500 gpm.

The term high pressure/low flow can be defined as, but not limited to, a pressure between approximately 500 psig and up to approximately 10,000 psig at a flow rate ranging between 0.5 gpm and up to approximately 50 gpm.

A list of the components will now be described.

Figure 1B:
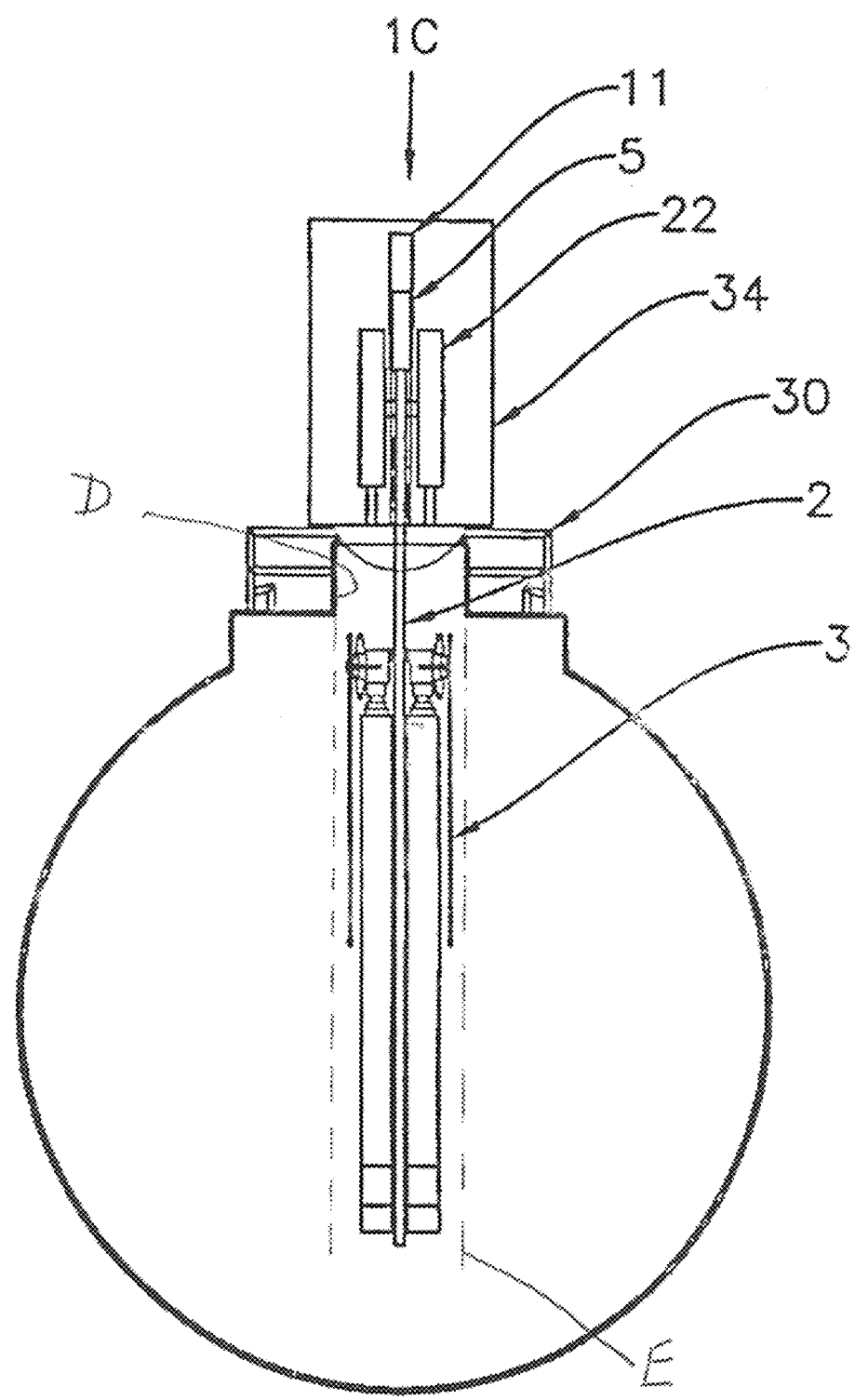
FIG. 1B is a side section view of the Programmable Railcar Tank Cleaning System of FIG. 1A along arrow 18B in the folded position mounted in a typical railcar.
Figure 1C:
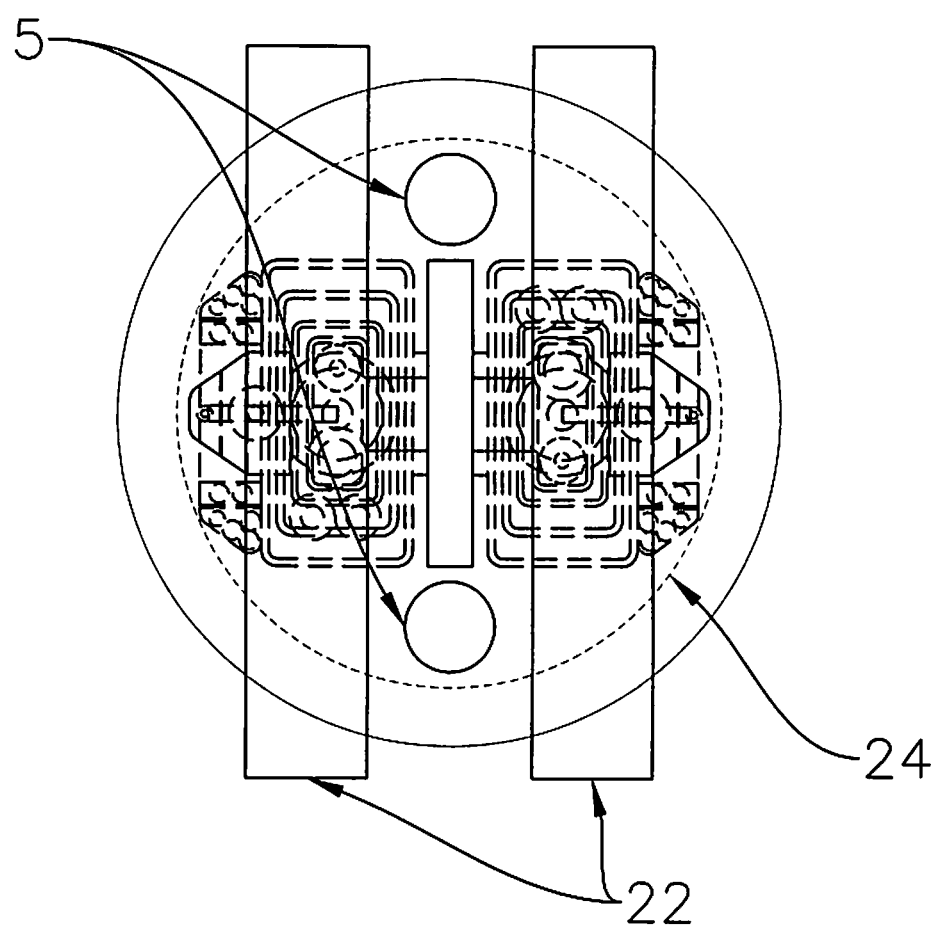
FIG. 1C is a top view of Programmable Railcar Tank Cleaning System of FIG. 1B mounted in a typical railcar.

2 mast
3 dual booms
4 cables
5 hydraulic cylinders (actuators)
6 fluid jet nozzle
7 low pressure counterbalancing nozzles
8 high pressure nozzle
9 high pressure counterbalancing nozzles
12 nozzle transverse axis
13 nozzle elevation axis
14 hydraulic cylinders
15 coaxial hose arrangement
16 transverse hydraulic hoses
17 elevation hydraulic hoses
19 outer energy chain
20 inner energy chain
21 hose/conduit
22 hose reels
23 nozzle assembly
24 hoses/conduits
25 low friction slide pads
26 boom elevation pivot
28 spring loaded high pressure nozzle
29 final stage
30 railcar tank
32 nozzle assembly
34 upper assembly
50 railcar tank cleaning system
51 control station
52 HPU (hydraulic power unit)
53 hydraulic power unit and manifold
55 high pressure fluid supply
60, 61 hydraulic motors
63 mounting plate
64, 65 rotary joints (seals and bushings/bearings)
66, 67 rotary housing(s)
68, 69 rotary encoders
70 user screen
71 keyboard
72 mouse
73 pushbutton(s)
74 joystick controller(s)
76 multiple screens
78 CPU (central processing unit)
80 touch screen
81 joystick controllers
82 pushbuttons
83 handheld case
84 electrical cable
85 switches
100 transverse axis
102 elevation axis
120 spur gears
122 pinion gears
124, 126 bearings
130 sprocket
132 drive sprocket
134 roller chain
136 bearings
140 manifold block
142 hydraulic circuit components
144 servo valves
146 frame structure
148 electric panel
150 lower arm structure
152 rotary union
160 inlet pipe
162 outlet pipe
164 seals
166 bearings
168 rotary union
170 fluid jet assembly Referring to FIGS. 1 to 11, the present invention can:

Fold to a maximum folded body envelope so that the section installed in a railcar can fit down existing manways down to approximately 18" in diameter, as shown in FIG. 1B. The diameter of the manways opening D being approximately 18 inches with the envelope E being less than approximately 18 inches in diameter.

Clean rail cars approximately 72" in diameter up to and beyond approximately 102" in diameter Push waste to the center drain Use LiDAR (light detection and ranging) to scan and map the waste topology Operate in explosive or flammable environments Operate in high temperature environments Referring to FIGS. 1-11, the present invention can include:

A mast 2 supporting dual booms 3, low pressure nozzle assembly, high pressure nozzle assembly, control station, hydraulic power unit and manifold 53

Coaxial hose arrangement 15—High pressure hose inside low pressure hose 21, for a compact design Hydraulic Cylinders 14 to extend and retract the 3 stage arms horizontally up to approximately 25 feet in opposing directions Cables 4 controlled by hydraulic cylinders 5 to raise and lower the boom arms 3

Low pressure, high flow hose feeding 1 or more nozzles at the end of the booms 3: up to approximately 5,000 psi and up to approximately 500 gpm High pressure, low flow hose feeding 1 or more nozzles at the end of the booms 3 up to approximately 5,000 to approximately 10,000 psi and up to approximately 50 gpm Hose and control wiring/cables routed through boom 3 arms in combination with energy chain to support and guide the hoses and control wires/cables as the boom 3 extends and retracts Low pressure counterbalancing nozzles 7 to counteract the low pressure nozzle 6 thrust loads High pressure counterbalancing nozzles 9 to counteract the high pressure nozzle 8 thrust loads Hose reels 22 to payout and take-up hose and wiring as boom 3 extends and retracts Spring loaded high pressure nozzles 28 to compensate for pressure variations Nickel plating on wetted mechanical structure to counteract corrosive environments Referring to FIGS. 1-11, the upper assembly 34 houses the actuators 5 for the boom elevation function, as well as the hose reel 22 This assembly 34 mounts to a manway on the top of the rail car tank through an adjustable manway adapter that allows the invention to gimble and rotate about the manway opening such that invention can be aligned and tilted, such that when deploying the booms 3, any obstructions can be avoided.

The upper assembly 34 supports a mast 2 which runs vertically down through the tank opening, providing a means to mount the booms 3. Hydraulic cylinders 11 can raise and lower the mast 2 in order position the boom 3 assembly closer to the waste at the bottom of the tank. In further embodiments, a rack and pinion system can drive the mast 2 up and down.

The boom 3 extends and retracts as well as pivots up and down, in order to position the nozzle assembly 32 in the railcar tank 30. FIG. 1E shows the boom 3 also provides a conduit for the low pressure hose 21, high pressure hoses 24, transverse hydraulic hoses 16 and elevation hydraulic hoses 17 for the nozzle assembly 23.

Four basic degrees of freedom per boom 3 (8 total). First, the boom elevation cable 4 raises and lowers the boom 3. Second, hydraulic cylinders 14 in the boom extend and retract to adjust the overall length of the boom 3. Third, the nozzle elevation axis 13 rotates the low and/or high pressure nozzles either clockwise or counterclockwise abut an axis perpendicular to the longitudinal boom axis. Lastly, the nozzle transverse axis 12 directs the nozzle assembly 32 either clockwise or counterclockwise about the longitudinal axis of the boom 3.

Boom elevation actuators 5 (cylinders, winches, or the like) located in the upper assembly 34, outside the railcar tank 30, actuate the boom 3 elevation via cables 4. The boom elevation cable(s) 4 are routed along the mast 2, guided via cable guide pulley(s) 36, and fastened to the boom 3. Retracting these cable(s) 4 causes the boom 3 to be raised relative to mast 2 via boom elevation pivot 26, and extending these cable(s) 4 causes the boom 3 to be lowered relative to the mast 2 via boom elevation pivot 26.

The boom 3 sections telescope inside the next corresponding section and are supported by low-friction slide pads 25. In some applications it will also be beneficial to replace the boom slide pads 25 with rollers to carry the load with reduced friction.

Flexible hoses are used to route wash water and liquefier through the pivoting elbow and to the nozzle assemblies 32 with a single combination hose reel 21 or two individual hose reels 21 to take up the hose(s) as the boom 3 extends and retracts. Alternatively, telescopic sections of metal tubing or conduit can be used to accommodate the boom extend and retract movement eliminating the need for the hose reel(s). In a further embodiment, a combination of flexible hose and metal tubing or conduit can be used.

The hydraulic actuators 5 that operate the boom raise/lower movement are located at the top of the unit, outside the tank, where traditional materials can be used in a less aggressive environment. These actuators 5 are coupled to the rotating booms 3 via metal cables 4 raising the boom up. Lowering the boom 3 can be via a second cable, opposing spring tension, gravity, or other returning mechanism. Alternatively, a push-pull cable mechanism (such as a cable in a sheath) can be used to handle operation in both directions from a single cable.

The low pressure hose/conduit 21 can be made of a flexible metal conduit, convoluted metal hose, or flexible rubber hose and is routed down along the mast 2 and boom 3 to meet the Nozzle Assembly 32 at the forward end of the boom final stage 29. The low pressure hose/conduit 21 can be flexible to allow for bending at the boom elevation pivot 26, and to wrap around the Hose Reel 22. In order to provide take-up when the boom 3 is retracted the low pressure hose 21 is accumulated on a hose reel 22 in the Upper Assembly 34. As the boom 3 is retracted the excess hose is reeled onto the hose reel 22 and as the boom 3 is extended the hose is reeled off.

The smaller, high pressure hose/conduit 24, also made out of a flexible metal conduit, convoluted metal hose, or rubber hose can have its' own hose reel 22. The hose reel 22 can have a second circuit allowing high pressure water to be fed through the hose reel 22 to the high pressure hose/conduit 24. The high pressure hose/conduit 24 can be retracted and accumulated on the hose reel 22 along with the low pressure hose/conduit 21.

Figure 1D:
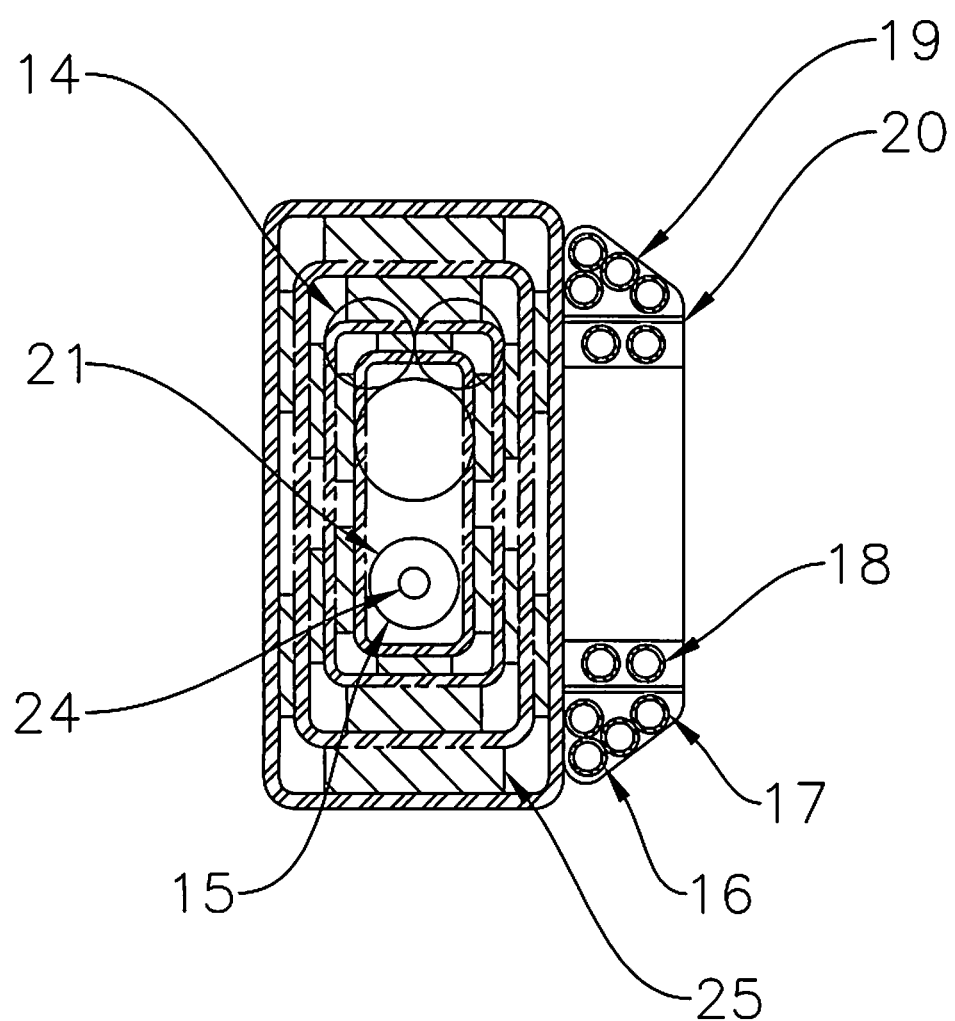
FIG. 1D is a section view of a typical boom arm.
Figure 1E:
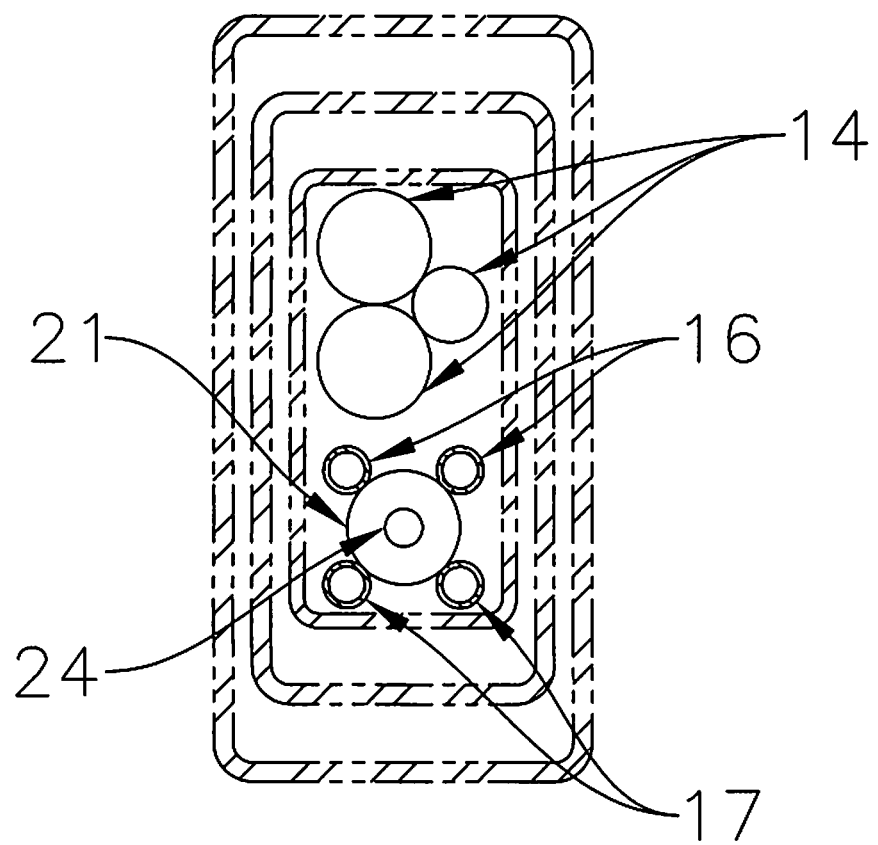
FIG. 1E is an alternate section view of a boom arm.
Figure 1F:
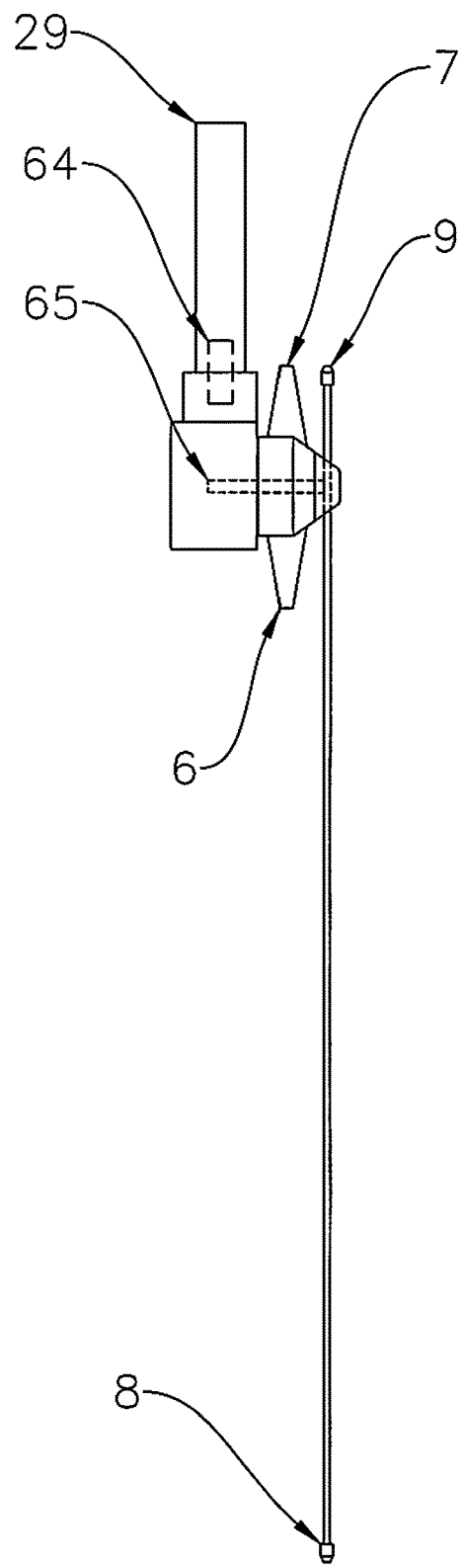
FIG. 1F is view of the low pressure and high pressure nozzle assembly.
Figure 1G:
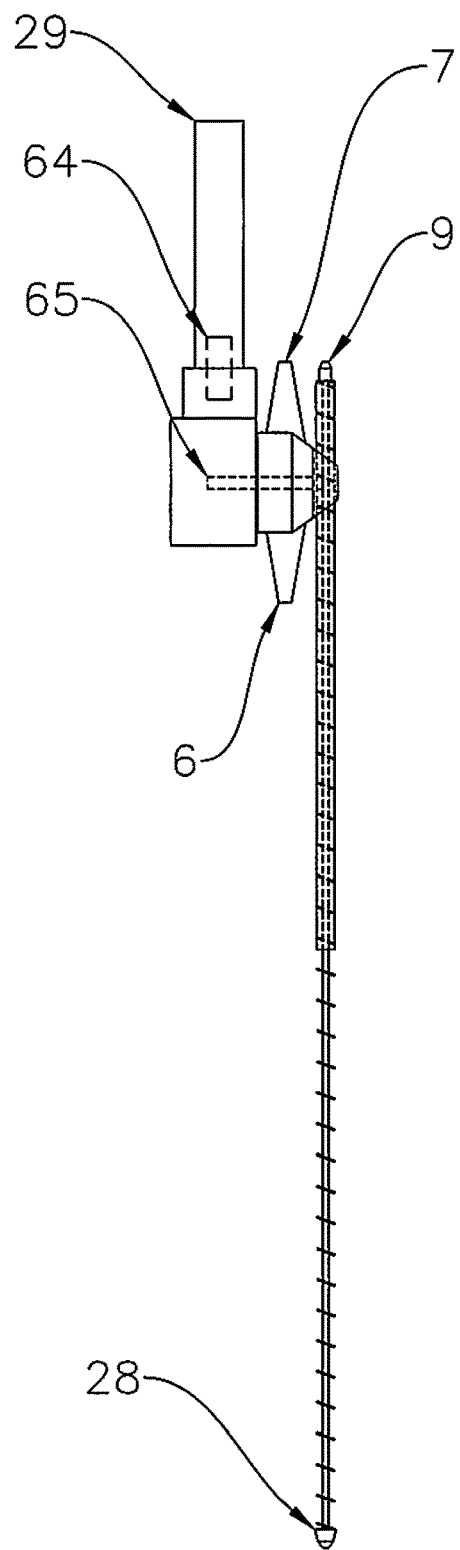
FIG. 1G is an alternate view of the low pressure and high pressure nozzle assembly with a spring loaded high pressure nozzle.
Figure 1H:
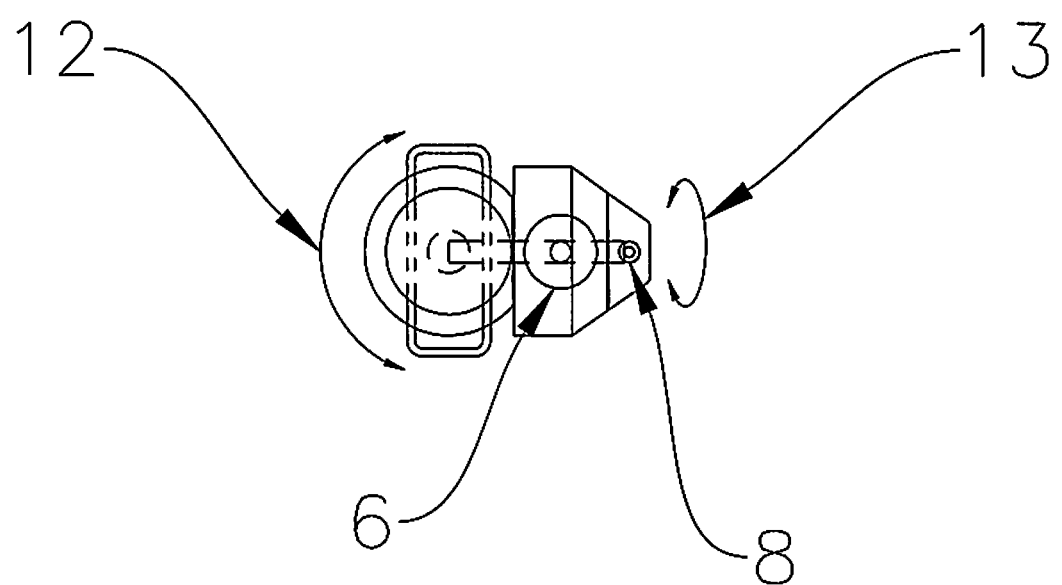
FIG. 1H is view of the nozzle assembly depicting the transverse and elevation axis.

In the preferred embodiment, FIG. 1D shows the high pressure hose/conduit running through the center of the product hose/conduit 21 in order to save space and simplify hose management.

Feeding the nozzle assembly 32, and running along the rectangular mast 2 and telescopic boom sections 3, supported by an outer energy chain 19 and an inner energy chain 20, can be the low pressure hose 21 that leads to a hose reel 22 in the upper assembly 34.

Along the telescopic boom section 3, a hose management system consisting of an inner energy chain 19 and an outer energy chain 20 can guide and support the hydraulic hoses during extension and retraction.

Figure 2:
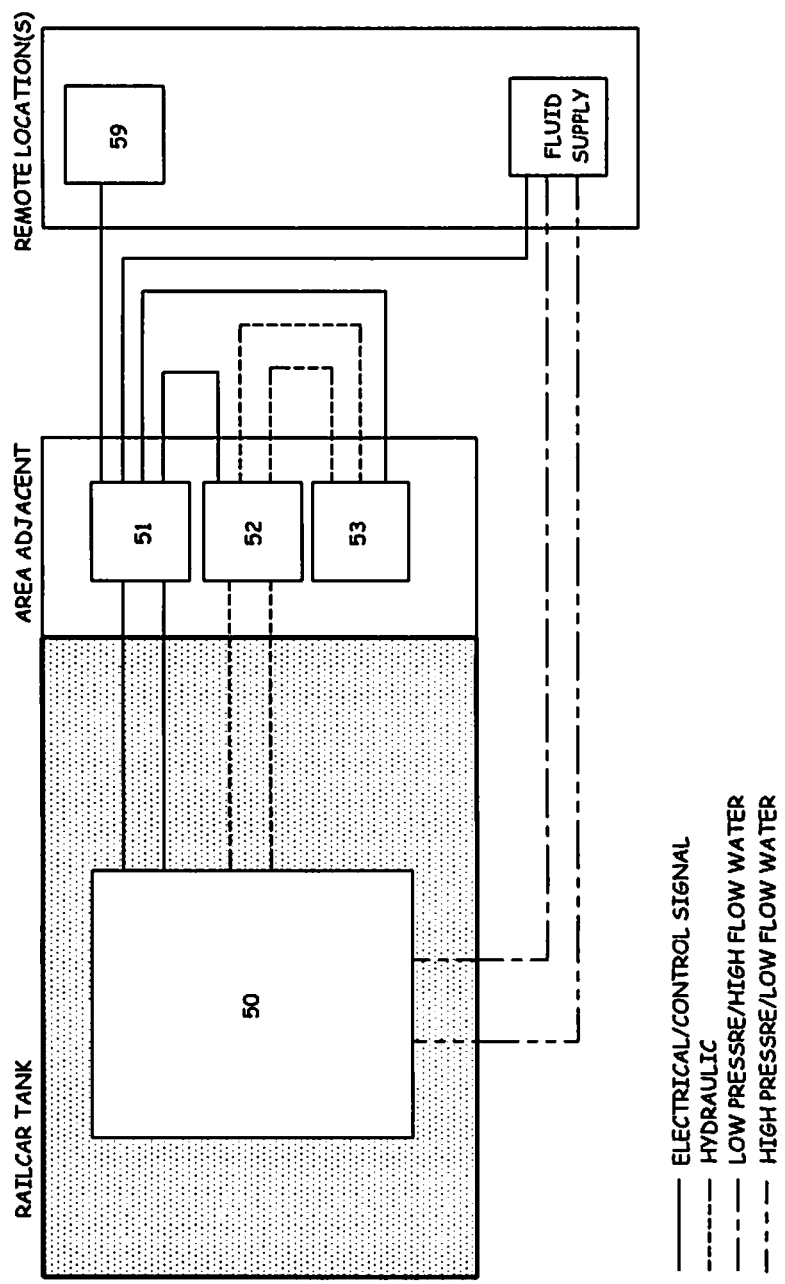
FIG. 2 is a block diagram of the top-level system architecture.

In reference to FIG. 2, the railcar tank cleaning system 50 can be mounted in an area with hazardous dust and vapors where the hydraulic power unit (HPU) 52, hydraulic manifold 53 and control station 51 can be located adjacent the classified area as close to the railcar tank cleaning system 50 as possible, but outside any classified, hazardous area. In certain embodiments, a remote control station 54 can be mounted up to approximately 1000 feet away (or more). Low and high pressure fluid supply 55 can be connected to a dedicated process skid or connection to an onsite fluid processing system.

The present invention can be connected to a hydraulic power unit (HPU) 52 that is comprised of, but not limited to, the requisite hydraulic pump driven by an electric motor to supply the system with flow and pressure of hydraulic fluid from an integrated storage reservoir. Supply and return hoses connect between the hydraulic power unit 52 and the hydraulic manifold 53. Flexible cables provide electrical and control signals between the control station 51, HPU 52, and hydraulic manifold 53. In a further embodiment, interconnect wiring can allow communication and/or discreet I/O between the programmable railcar tank cleaning system and any fluid supply system. Communication could include, but not limited to, Ethernet, Profibus, DeviceNet, or any other network protocol or fieldbus communication protocol.

Figure 3:
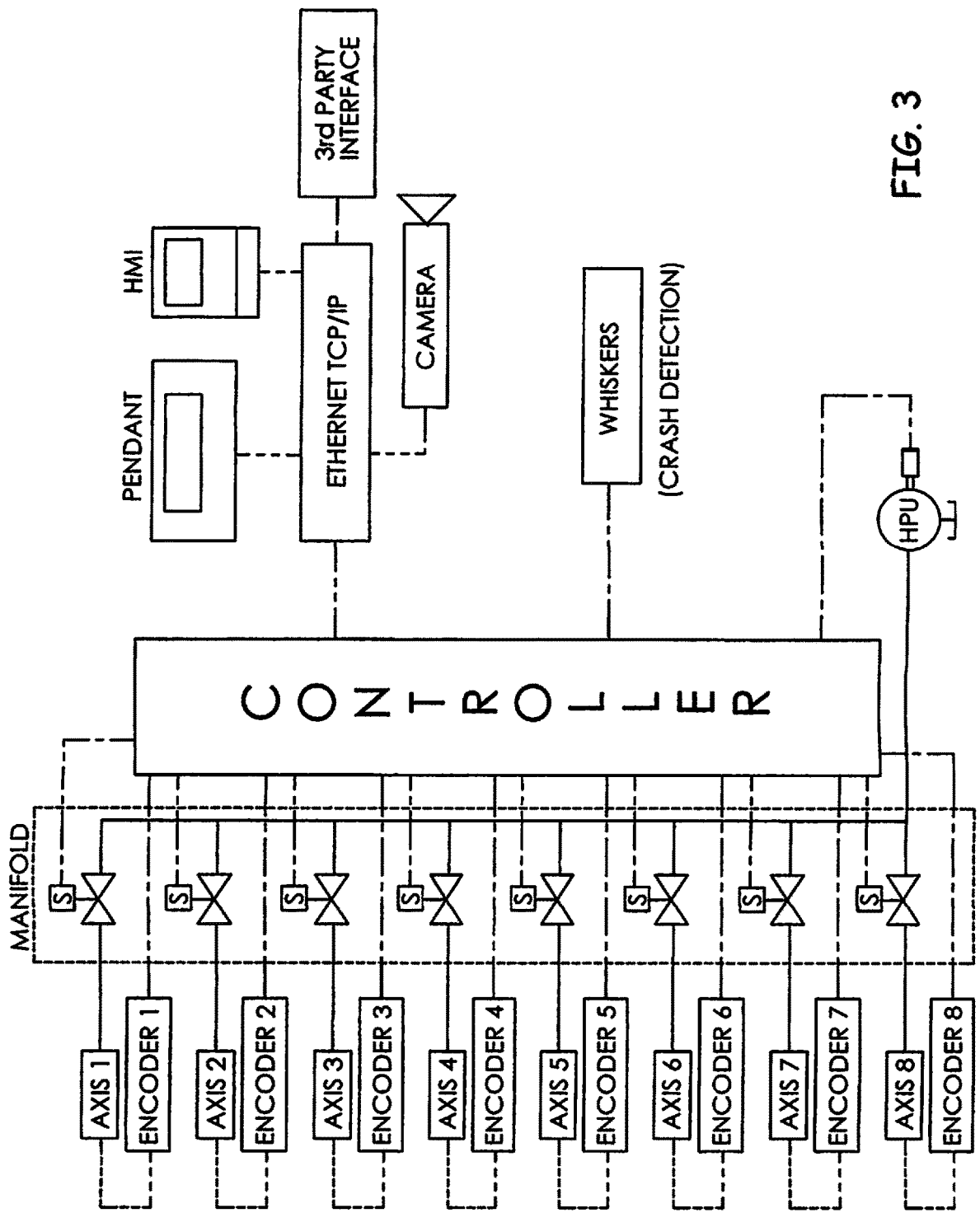
FIG. 3 is a block diagram of the preferred control layout.

FIG. 3 shows a preferred control layout where 8 axes with closed loop control from a hydraulic controller receives commands from the control station to drive either a servo valve, a proportional servo valve, corresponding with each axis. The HPU provides a constant supply of hydraulic oil to valves on a manifold 53 that in turn modulates the flow to corresponding hydraulic motors and/or actuators based on encoder feedback and toolpaths developed by software at the control station. Encoder feedback can be, but not limited to, absolute positional data sent to the motion controller through a serial interface for closed loop control of the hydraulic actuators. For operation in classified hazardous areas, the preferred embodiment incorporates fiber optic encoders. In an alternative embodiment, encoders can be wired to isolation barriers for intrinsically safe operation.

A third party interface can be integrated for communication and/or discreet I/O between the programmable railcar tank cleaning system and any fluid supply system, robotic arm, boom, or ancillary control system from an outside source. Communication could include, but not limited to, Ethernet, Profibus, DeviceNet, or any other network protocol or fieldbus communication protocol. Discreet I/O could include, but not limited to, run/stop signals, on/off signals, safety interlocks, and the like.

Figure 4:
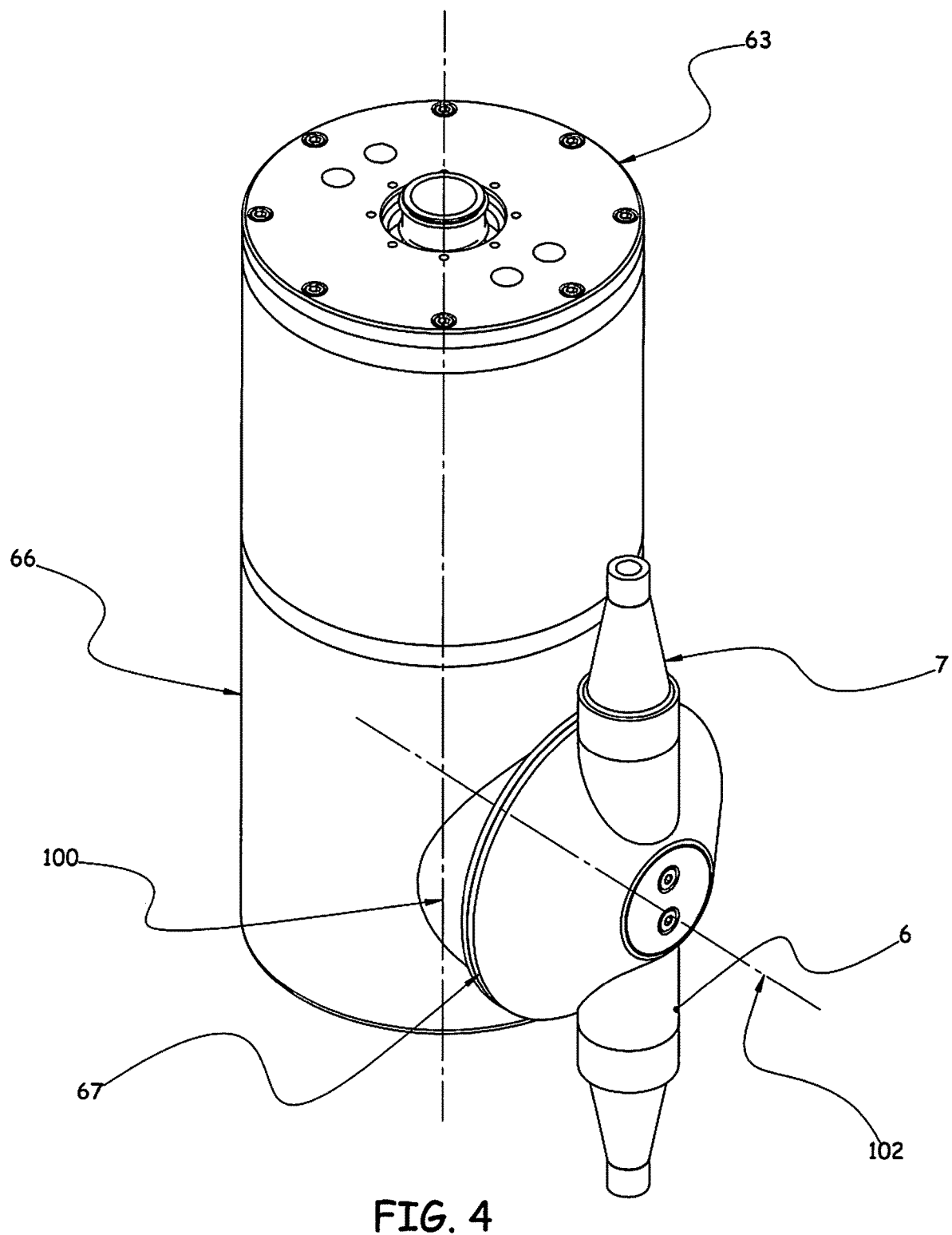
FIG. 4 illustrates the nozzle assembly of FIG. 1.
Figure 4A:
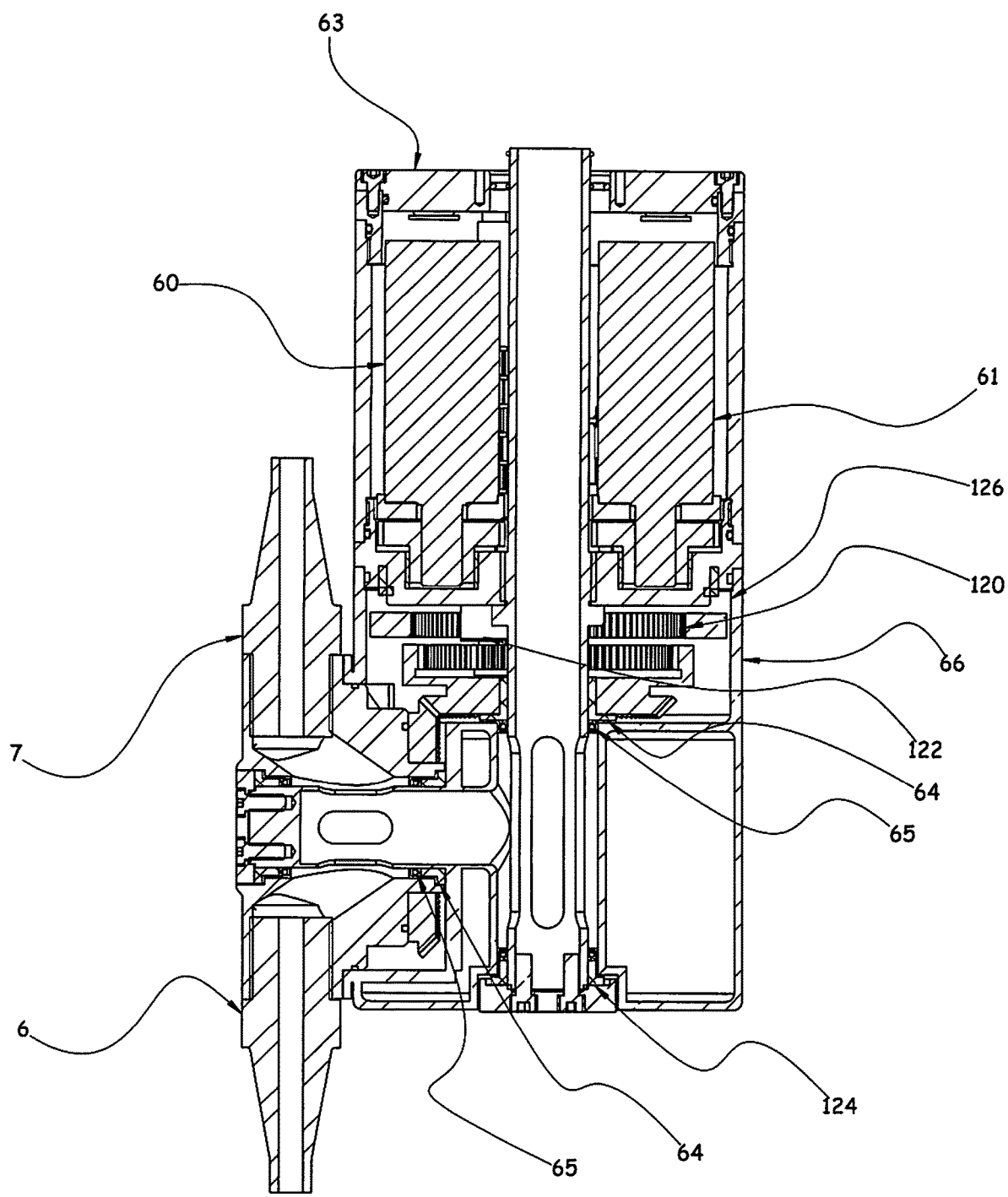
FIG. 4A is a cross section side view of FIG. 4.
Figure 4B:
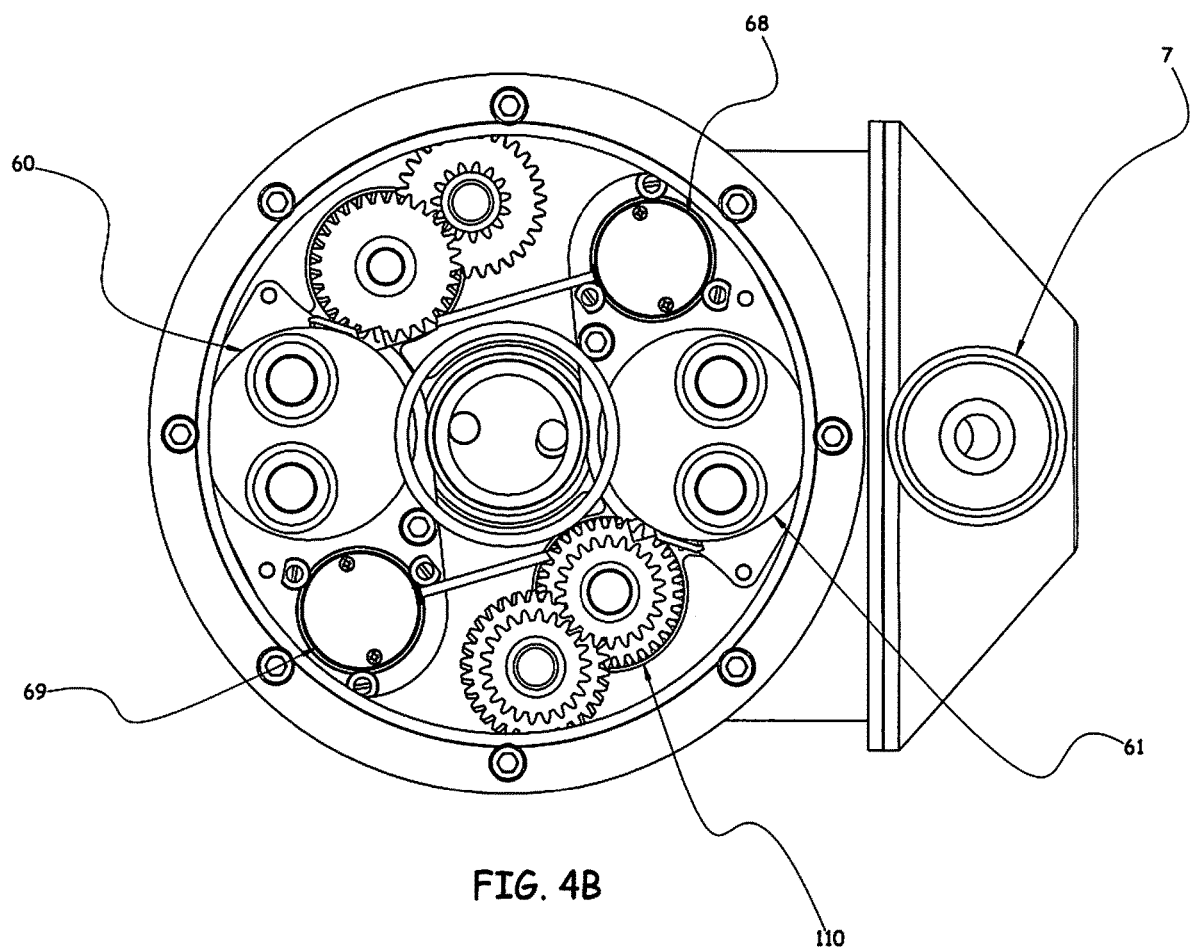
FIG. 4B is a top down cross section view of FIG. 4.

FIGS. 4, 4A, and 4B depict a nozzle assembly comprised of 2 hydraulic motors 60 and 61, a fluid jet nozzles 6, 7, 8, and 9 a mounting plate 63, 2 or more rotary joints, and 2 or more rotary housing 66 and 67, and 2 or more rotary encoders 68 and 69.

Each rotary housing 66 and 67 are coupled through rotary actuators to provide two degrees of freedom comprised of one axis 100 known as transverse and one axis 102 known as elevation. Transverse can be described by 360 degrees of rotation about the longitudinal, horizontal axis 102. Elevation can be described by 360 degrees of rotation of the fluid jet(s) about an axis 102 perpendicular to the longitudinal, horizontal axis 100.

On the distal end of the nozzle assembly is a low pressure/high flow fluid jet nozzle 6 and 7. From here on out, in the descriptions of the preferred embodiments, low pressure/high flow water is defined as, but not limited to, a pressure of up to approximately 5000 psig at a flow rate ranging from approximately 10 to approximately 500 gpm. In another embodiment, the fluid jet 6 and 7 can be high pressure/low flow. From here on out, in the descriptions of the preferred embodiments, high pressure/low flow is defined as, but not limited to, a pressure range from approximately 5,000 psig to approximately 10,000 psig at a flow rate range from 0 to approximately 50 gpm. In another embodiment, a plurality of high flow, low pressure 6 and 7 and high pressure, low flow fluid jets 8 and 9 can be incorporated in various combinations and orientations.

Rotary joints 64 and 65, are comprised of seals 64 and bushings/bearings 65 that permits the passage of high pressure, low flow liquids and/or low pressure, high flow fluids while simultaneously allowing 360 degrees of rotation at each axis.

The transverse axis is comprised of a hydraulic motor 60 driving a gear set comprised of spur gears 120 and mating pinion gears 122. The motor rotates the lower rotating housing 67 of the nozzle assembly 23 containing the fluid jet(s) in a twisting motion about the axis 100 to achieve up to 360 degrees of motion. The pinion gear 122 is driven from the motor 60 though a parallel shaft arrangement with the corresponding spur gear 120 The motor is affixed to the upper rotating housing 66 which is coupled to the lower rotating housing 66 through a set of bearings 126 and 124. The bearings can be ball, roller, or plain bearings or bushings.

In another embodiment, the gear set can be comprised of a worm with the worm wheel mounted to lower rotating housing 67 is coupled to the upper rotating housing 66 through a bearing set 124 and 126. A rotary union is plumbed with one or more passages to the end of the shaft of the lower rotating housing 67 allowing flow of high pressure, low flow liquids and/or low pressure, high flow fluids while simultaneously allowing approximately 360 degrees of rotation at each axis. A further embodiment can incorporate the alternate rotary union. An encoder is coupled to the hydraulic motor for positional feedback for closed loop control. For operation in classified hazardous areas, the preferred embodiment incorporates fiber optic encoders. In an alternative embodiment, encoders can be wired to isolation barriers for intrinsically safe operation.

In alternate embodiment, the transverse axis can be comprised of the lower arm structure 150 supporting a hydraulic gear motor 61 with drive sprocket 132 mounted on the output shaft coupled to a sprocket 130 through a roller chain 134. The sprocket rotates the fluid jet(s) 6, 7, 8, and 9 approximately 360 degrees. The fluid jet(s) 6, 7, 8, 9 is supported by a set of bearings 136. A rotary union 152 is plumbed with one or more passages to the end of the shaft of the fluid jet(s) 6,7,8, and 9 allowing flow of high pressure, low flow liquids and/or low pressure, high flow fluids while simultaneously allowing approximately 360 degrees of rotation at each axis. An absolute encoder 68 is coupled to the hydraulic motor 61 for positional feedback for closed loop control. For operation in classified hazardous areas, the preferred embodiment incorporates fiber optic encoders. In an alternative embodiment, encoders can be wired to isolation barriers for intrinsically safe operation.

Figure 5:
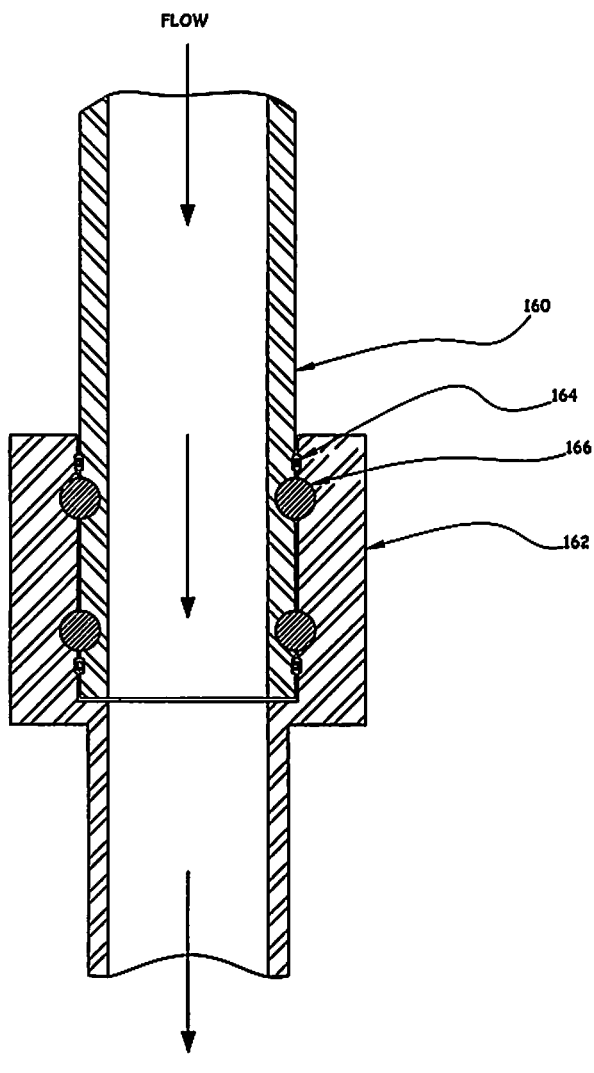
FIG. 5 shows the cross-section view of a rotary union.
Figure 7:
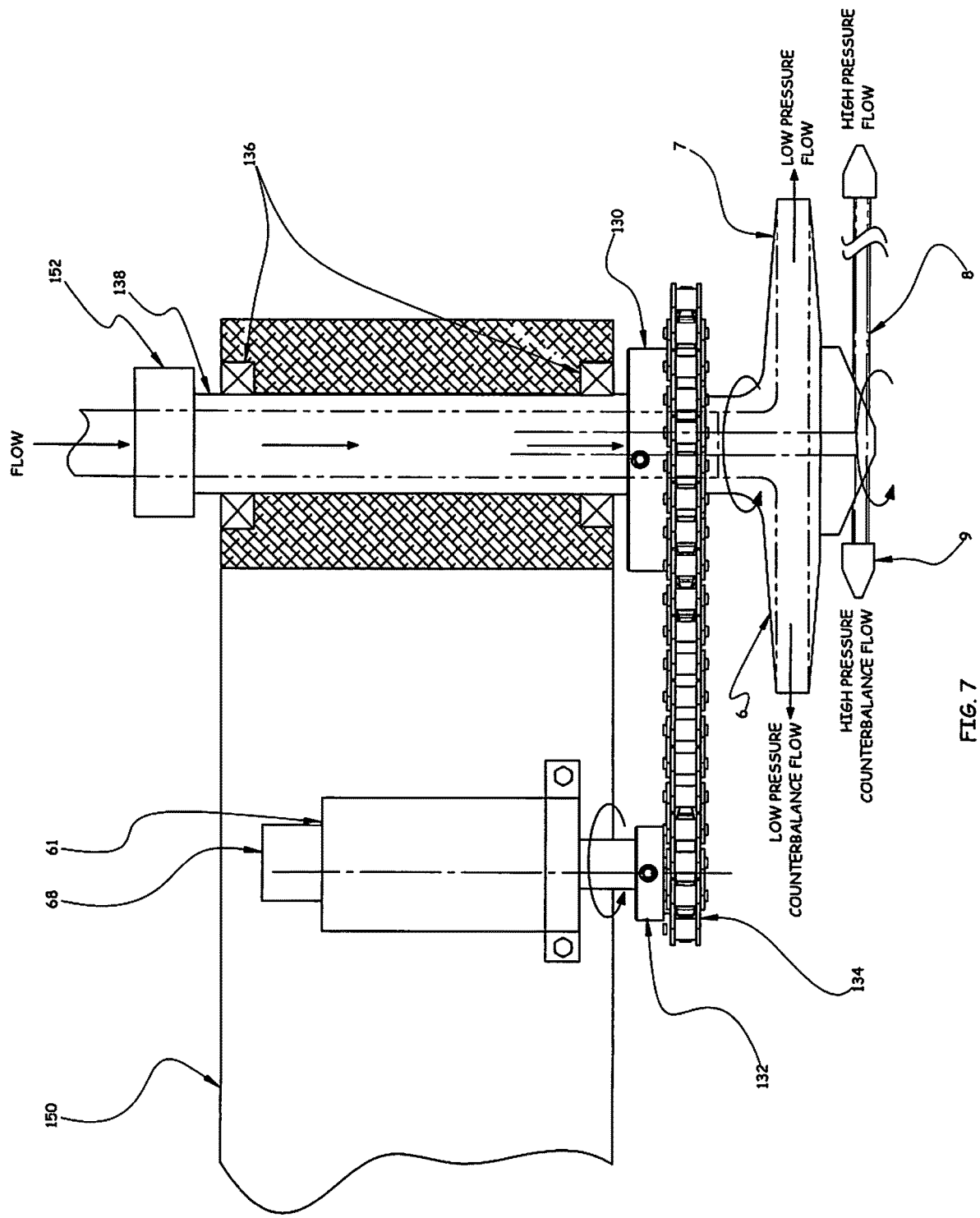
FIG. 7 is a cross-section view of the elevation axis comprising a sprocket and chain arrangement.
Figure 8:
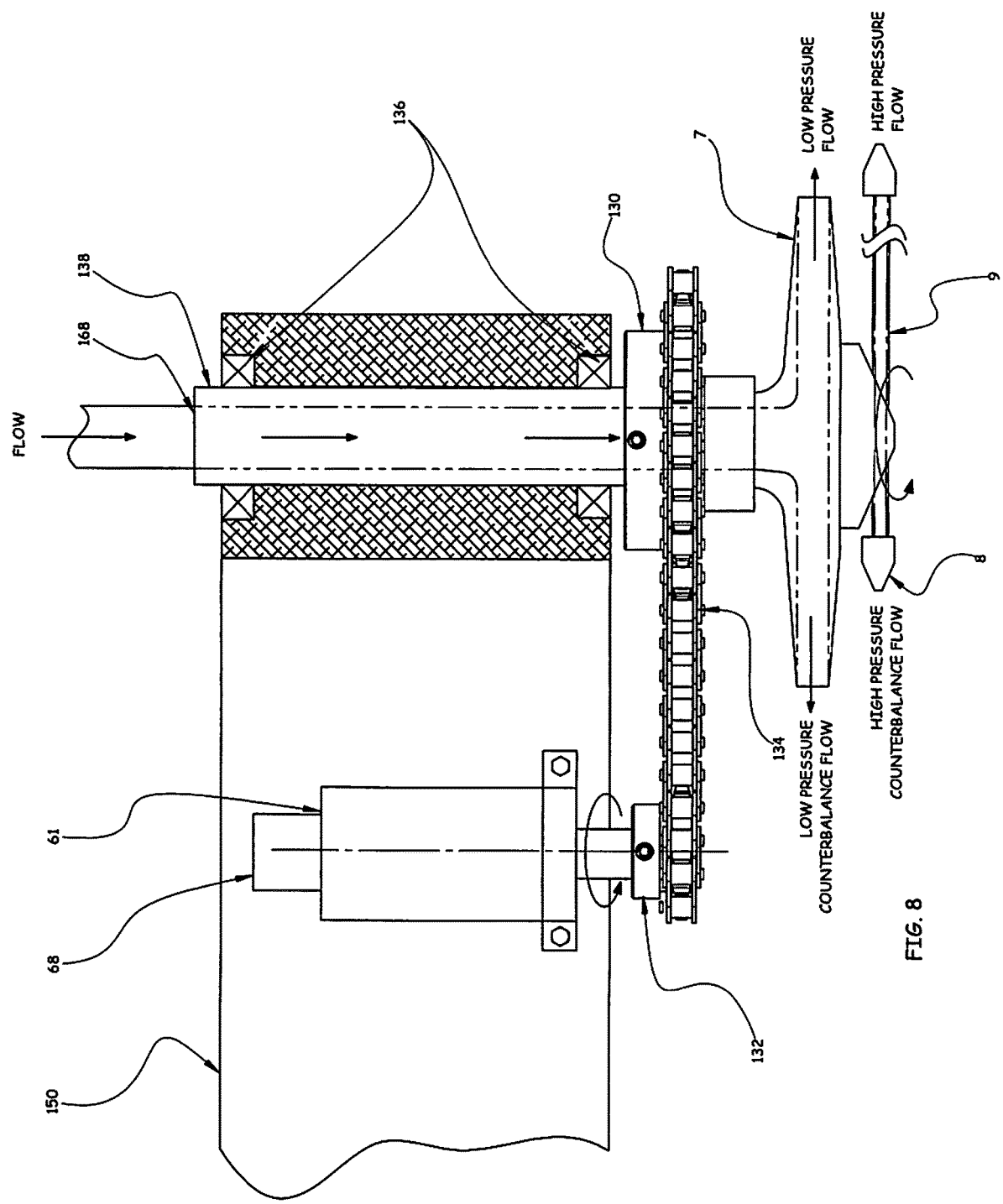
FIG. 8 is an alternate view of the elevation axis using the alternate rotary union of FIG. 5.

FIG. 7 depicts an alternate embodiment with an alternate rotary union 168 of FIG. 5 integrated with axis at the fluid jet 6,7,8, and 9 of FIG. 7. The rotary union is comprised of an inlet pipe 160, an outlet pipe 162, 2 or more seals 164 and two or more sets of ball bearings 166 where the outlet pipe 162 can rotate independently about the longitudinal axis of the inlet pipe 160 but still allowing passage of high pressure, low flow liquids and/or low pressure, high flow fluids while simultaneously allowing 360 degrees of rotation at each axis.

Figure 6:
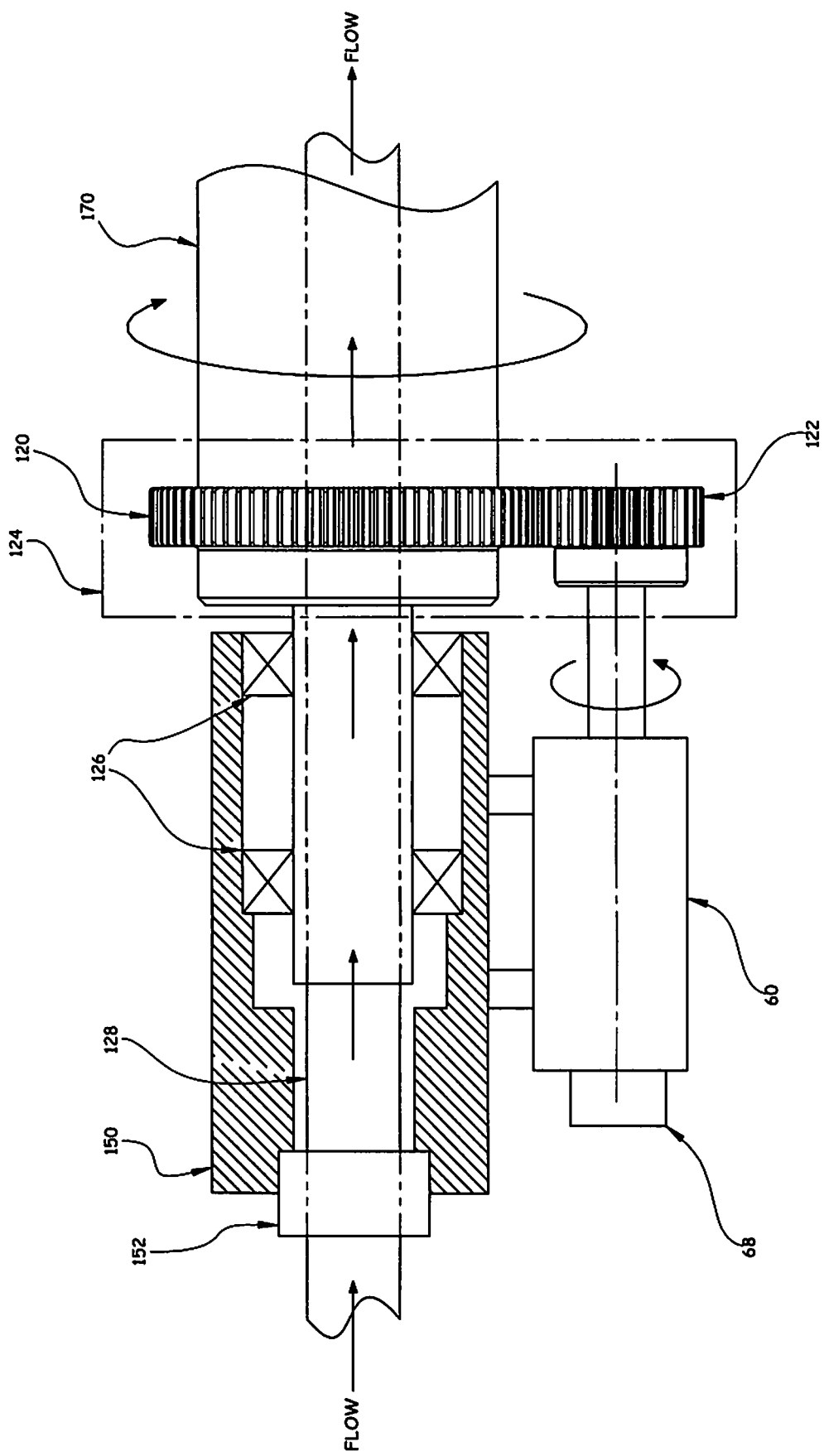
FIG. 6 is a cross section view of the transverse axis comprising spur gears.

An alternate embodiment of the elevation axis of FIG. 6 replaces the chain and sprocket arrangement with hydraulic gear motor 60 driving a gear set 120 and 122 that rotates the fluid jet(s) to achieve up to approximately 360 degrees of motion about a plane parallel to the longitudinal, vertical axis. The gear set 120 and 124 is comprised of a pinion gear 122 on the end of a motor 60 shaft with a corresponding spur gear 120 driving the fluid jet assembly 170. The motor 60 is affixed to a bracket on the lower arm structure 150 and drives the spur gear 120 coupled to the fluid jet assembly 170. The jet assembly is supported by a set of bearings 126. In another embodiment, the gear set can be comprised of a worm with the worm wheel mounted to fluid jet(s) supported by set of bearings.

In further embodiments, the lower arm structure 150 and fluid jet assembly 170 can each be directly coupled to the output of hydraulic gear motors 60 and 61, or similarly, a hydraulic actuator. A hydraulic actuator can have a hollow bore construction which allows for more efficient, compact, and robust routing of hoses and cables.

Another embodiment of the device would use explosion proof electric motors to manipulate the nozzle assembly 32. The motors and actuators would be powered by cables coming from the device within the tank section being cleaned to an electrical motion controller and power supply residing in the control station located outside the classified hazardous area. In another embodiment, the control station can be equipped with explosion proof or intrinsically safe components allowing operation in a classified hazardous zone where flammable gases or dust may exist. An alternate embodiment has the control station purged and pressurized for use in hazardous and explosive locations.

A preferred embodiment uses servo valve (or proportional servo valve) control signals that can range from 0 to approximately 100 milliamps. In one embodiment, the signal could be up to, but not including, approximately +/−40 volts. In another embodiment, the control signal could be transmitted over Ethernet, Profibus, DeviceNet, or any other network protocol or field bus communication protocol.

The HPU 52 can include, but is not limited to, the requisite hydraulic pump driven by an electric motor to supply the system with flow and pressure of hydraulic fluid from an integrated storage reservoir. Supply and return hoses connect between the hydraulic power unit and the hydraulic manifold.

Figure 9:
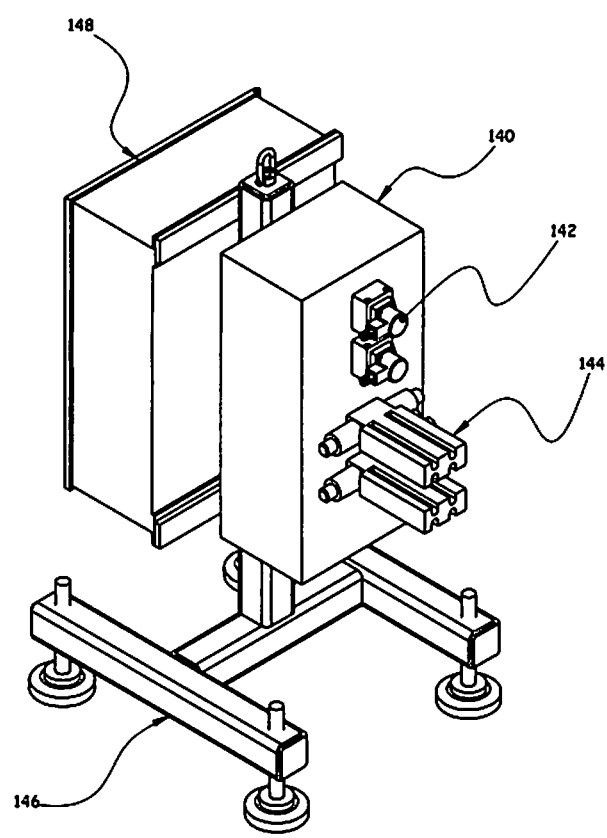
FIG. 9 is perspective view of the hydraulic manifold.

In reference to FIG. 9, the hydraulic control system can include an HPU 52 and manifold block 140 populated with precision servo valves 144 used to control the nozzle assembly 32 and boom 3 elevation. Other hydraulic circuit components 142 can also be mounted to the manifold. Hydraulic circuit components 142 can include, but not limited to, servo-proportional valves, solenoid valves, pressure relief valves, fittings, accumulator, a manifold block, gauges, filters, or any devices required to control the nozzle assembly 32 and boom elevation. The manifold 140 and corresponding electrical panel 148 will be mounted onto a common frame structure 146 and remotely located outside the classified hazardous area. In another embodiment, the electrical circuits will be connected to intrinsically safe barriers and the electronic components will be rated for use in classified hazardous areas.

In another embodiment, the electrical panel 148 can be positively purged and monitored with a safety pressure switch interlocked into the control system. If the enclosure does not see adequate pressure, then the enclosure cannot be energized. Housed in the electrical panel 148, can be a motion controller that sends signals to the servo valves 144 in order to manipulate all axes.

Figure 10:
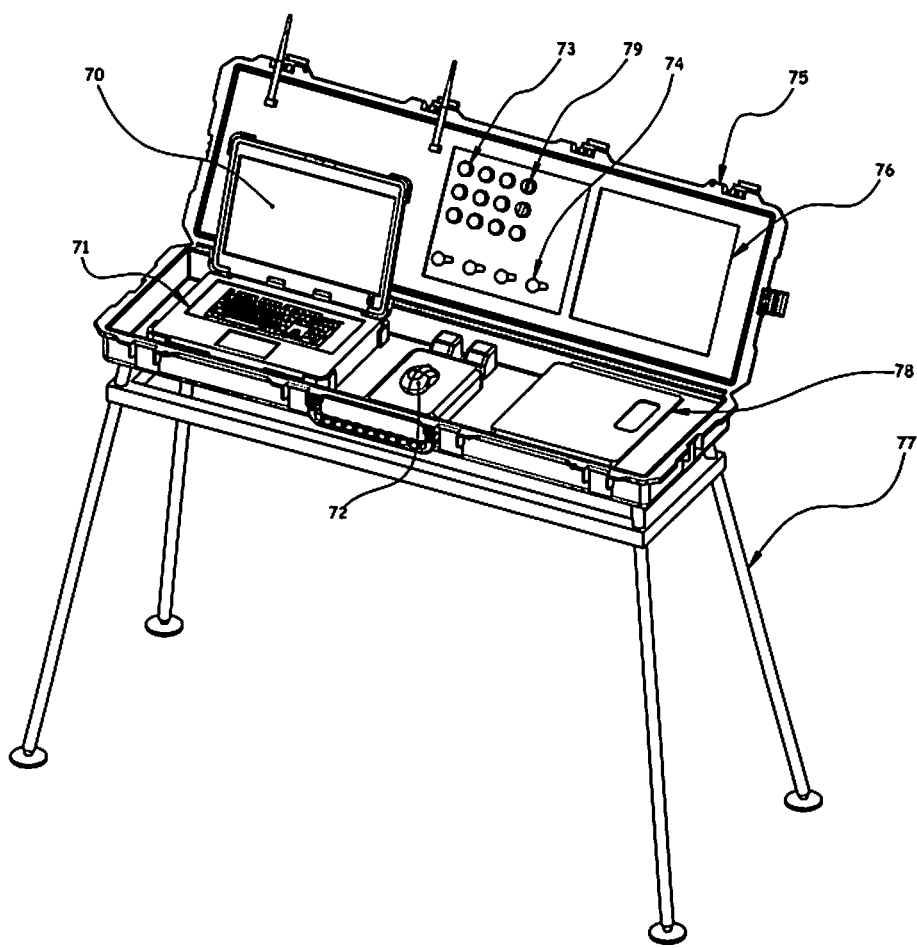
FIG. 10 is perspective view of the control station.

FIG. 10 depicts a human machine interface (HMI) comprised of a user screen 70, keyboard 71, mouse 72, central processing unit (CPU) 78, operating system, control software, one or more pushbuttons 73, one or more switches 79, and/or one or more joystick controllers 74 all housed in a portable control station 75. In certain embodiments, a portable stand 77 can be implemented. In one embodiment, multiple screens 76 are incorporated. In one embodiment, a real-time operating system can be used.

Figure 11:
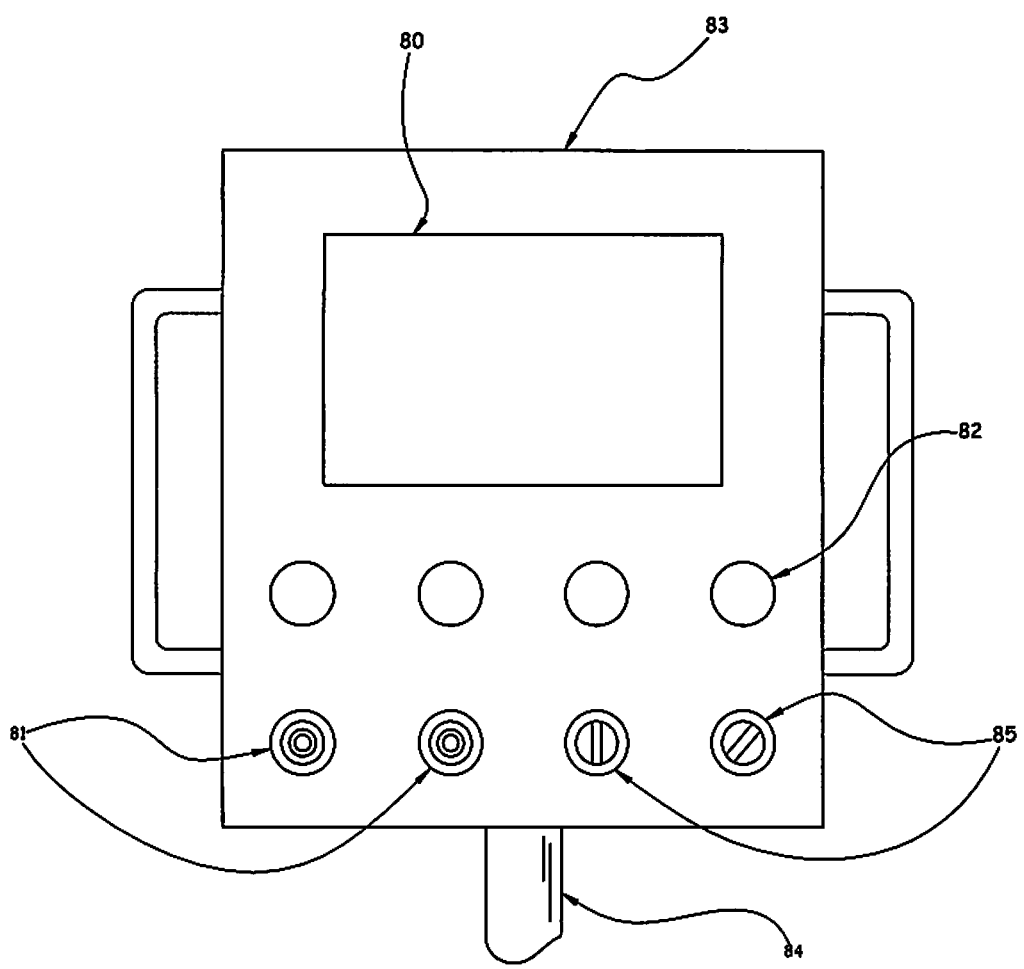
FIG. 11 is an illustration of a handheld remote control of a possible embodiment.

A handheld remote control is illustrated in FIG. 11 where certain embodiments can be used to control the nozzle assembly 32. The handheld remote control is comprised of a touchscreen 80, one or more pushbuttons 82, one or more switches 85, and/or one or more joystick controllers 81 all housed in a durable, hand held case 83. The handheld remote control is tethered to the control station through a flexible electrical cable 84. In one embodiment, the handheld remote control is wireless in which a local router is tethered to the handheld control station through a flexible electrical cable. In certain embodiments, the invention can be operated from a handheld remote control up to approximately 1000 feet away (or more).

The control software can include predefined tank profiles. At the HMI, an operator selects the required profile and inputs diameters, lengths, widths, heights, waste depths, etc. to configure the tank to the application. Locations of features, pumps, manways, etc. can also be entered. The nozzle assembly can then be positioned into this configuration. An operator can then select from predefined recipes based on the desired operation. User inputs, e.g., feed rate, pressure, flow, dwell times, etc., allow these recipes to be modified and saved as new recipes. Once a configuration is finalized, the kinematic algorithms determine the coordinates and angles of each axis to form a motion profile dictating the nozzle's motions. From this data, the control programs compile output commands to the motion controller. In certain embodiments, these profiles can be evaluated and edited at the HMI. In further embodiments, the motion profiles are entered into a simulation model for evaluation.

In reference to the preferred embodiment, the HMI can display the cleaning progress real time based on feedback from the control system. Alternately, an inspection system comprising, a camera, housing, lighting, and protective glass could be integrated into the nozzle assembly. In a further embodiment, the camera includes pan, tilt, and zoom functions. In certain embodiments, the camera can transmit an image to a display over a fiber optic cable allowing operation in an area with hazardous and explosive vapors and dusts.

In certain embodiments, distance measuring can be accomplished through a laser sensor mounted on the nozzle assembly 32. In other embodiments, the distance sensor could include an IR (infrared radiation) sensor, LiDAR (light detection and ranging), or any other noncontact technique to obtain distance measurements. In certain embodiments, a laser pointer is utilized to pinpoint a location to be measured. A laser pointer can be mounted on the nozzle assembly 32 coordinated with the nozzle's line of sight. Coordinates can be recorded as an operator manipulates the nozzle and selects points with a laser sensor. Repeating as many times as needed. At the user screen, these points can be viewed, edited and linked together to configure the tank.

In a further embodiment, 3D mapping of the tank and waste surface(s) can be accomplished through one or more imaging sensors utilizing ToF (time of flight), stereo vision, structured light, or any imaging technology that can be used to develop 3D point clouds. The preferred embodiment can be equipped with the 3D imaging sensors integrated with nozzle assembly such that an operator can maneuver the 3D imaging sensor to an area in order to take a snapshot. This can be done manually using the remote control or HMI. In one embodiment, the sensors can be handheld. In an alternate embodiment, the sensors can be mounted remotely with a portable mounting structure. In this embodiment, the sensor can be operated independently from the nozzle assembly allowing an operator to scan new areas while the nozzle is cleaning. This increases the efficiency by reducing the overall cycle time. In another embodiment, sensors can be employed in conjunction with remote sensors.

In certain embodiments, scanning can be done real-time as the camera travels through an area. The generated point cloud will show on the touchscreen or HMI. Multiple point clouds can be linked together without external, dedicated targets. This data is loaded into the control software to be analyzed by 3D CAD software. An operator can edit and finalize the CAD rendering to be used as a predefined profile for use as described above. In other embodiments, the software automatically recognizes standard features from the point cloud and populates that region with a 3D surface. The remaining data is rendered and meshed into the existing 3D surfaces. This routine can be repeated until ended.

The safety features can include devices that are electrically connected to the control system that when activated brings all motion to a safe and controlled stop. The safety devices can include, but not limited to, e-stop buttons, e-stop cables, safety mats, light curtains, or scanning lasers. These devices can be employed in plurality and in any combination thereof Certain embodiments comprise further safety features that incorporate whisker style limit switches to detect interferences between the nozzle assembly and another object. Once a crash is detected, a signal is sent to the controller that brings any motion to a controlled stop. Whisker style limit switches can be, but not limited to, a limit switch actuated by a rod protruding parallel axially to the nozzle assembly body. A plurality of whisker style limit switches can be mounted radially around the nozzle assembly for approximately 360 degrees of detection. Other embodiments can use ultrasonic, laser, infrared (IR), proximity, or 3D scanners.

The programmable railcar tank cleaning system can operate as an independent, standalone unit. In further embodiments, the programmable railcar tank cleaning system can be integrated into existing control systems though hardwire signals, serial communication such as Ethernet, Profibus, DeviceNet, or any other network protocol or fieldbus communication protocol.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A hydraulically controlled, programmable railcar tank cleaning system that operates as an independent, standalone unit comprising:
   an upper assembly attached to a tank;
   a mast having an upper end attached to the upper assembly, and a lower end;
   a telescoping boom having a first end pivotally attached to the lower end of the mast, and a second end, the boom having a retracted position and an extended position, that pivots approximately 90 degrees from vertical to horizontal and extends up to and beyond approximately 25 feet; and
   a nozzle assembly attached to the second end of the boom with elevation and traverse capability;
   a motion controller, hydraulic power unit, and
   a manifold with adjustable electro-hydraulic valves.

2. A hydraulically controlled, programmable railcar tank cleaning system that operates as an independent, standalone unit comprising:
   an upper assembly attached to a tank;
   a mast having an upper end attached to the upper assembly, and a lower end;
   a telescoping boom having a first end pivotally attached to the lower end of the mast, and a second end, the boom having a retracted position and an extended position, that pivots approximately 90 degrees from vertical to horizontal and extends up to and beyond approximately 25 feet; and
   a nozzle assembly attached to the second end of the boom with elevation and traverse capability; and
   explosion proof electric motors with controls in a panel outside a hazardous area.

3. A hydraulically controlled, programmable railcar tank cleaning system that operates as an independent, standalone unit comprising:
   an upper assembly attached to a tank;
   a mast having an upper end attached to the upper assembly, and a lower end;
   a telescoping boom having a first end pivotally attached to the lower end of the mast, and a second end, the boom having a retracted position and an extended position, that pivots approximately 90 degrees from vertical to horizontal and extends up to and beyond approximately 25 feet; and
   a nozzle assembly attached to the second end of the boom with elevation and traverse capability; and
   an inspection system having a camera housed in a protective case behind protective glass.

4. A hydraulically controlled, programmable railcar tank cleaning system that operates as an independent, standalone unit comprising:
   an upper assembly attached to a tank;
   a mast having an upper end attached to the upper assembly, and a lower end:
   a telescoping boom having a first end pivotally attached to the lower end of the mast, and a second end, the boom having a retracted position and an extended position, that pivots approximately 90 degrees from vertical to horizontal and extends up to and beyond approximately 25 feet; and
   a nozzle assembly attached to the second end of the boom with elevation and traverse capability; and
   a distance measurement system comprising a laser sensor mounted on the nozzle assembly.

5. A hydraulically controlled, programmable railcar tank cleaning system that operates as an independent, standalone unit comprising:
- an upper assembly attached to a tank;
- a mast having an upper end attached to the upper assembly, and a lower end;
- a telescoping boom having a first end pivotally attached to the lower end of the mast, and a second end, the boom having a retracted position and an extended position, that pivots approximately 90 degrees from vertical to horizontal and extends up to and beyond approximately 25 feet; and
- a nozzle assembly attached to the second end of the boom with elevation and traverse capability; and
- an encoder transmitting data over fiber optic cables for operation in classified hazardous environments.

6. A hydraulically controlled, programmable railcar tank cleaning system that operates as an independent, standalone unit comprising:
- an upper assembly attached to a tank;
- a mast having an upper end attached to the upper assembly, and a lower end;
- a telescoping boom having a first end pivotally attached to the lower end of the mast, and a second end, the boom having a retracted position and an extended position, that pivots approximately 90 degrees from vertical to horizontal and extends up to and beyond approximately 25 feet; and
- a nozzle assembly attached to the second end of the boom with elevation and traverse capability; and
- one or more crash detection whisker style limit switches mounted radially around an end effector.

7. A hydraulically controlled, programmable railcar tank cleaning system that operates as an independent, standalone unit comprising:
- an upper assembly attached to a tank;
- a mast having an upper end attached to the upper assembly, and a lower end;
- a telescoping boom having a first end pivotally attached to the lower end of the mast, and a second end, the boom having a retracted position and an extended position, that pivots approximately 90 degrees from vertical to horizontal and extends up to and beyond approximately 25 feet; and
- a nozzle assembly attached to the second end of the boom with elevation and traverse capability; and
- software that analyzes point cloud data to recognize standard geometry and then populates missing data to yield a complete feature profile.

8. The hydraulically controlled, programmable railcar tank cleaning system of claim 7, further comprising:
- a 3D sensor that scans an area such that the software renders point cloud data into 3D CAD models.

9. A hydraulically controlled, programmable railcar tank cleaning system that operates as an independent, standalone unit comprising:
- an upper assembly attached to a tank;
- a mast having an upper end attached to the upper assembly, and a lower end;
- a telescoping boom having a first end pivotally attached to the lower end of the mast, and a second end, the boom having a retracted position and an extended position, that pivots approximately 90 degrees from vertical to horizontal and extends up to and beyond approximately 25 feet; and
- a nozzle assembly attached to the second end of the boom with elevation and traverse capability; and
- software that automatically recognizes point cloud data as standard geometry and inserts 3D surfaces.

10. A hydraulically controlled, programmable railcar tank cleaning system that operates as an independent, standalone unit comprising:
- an upper assembly attached to a tank;
- a mast having an upper end attached to the upper assembly, and a lower end;
- a telescoping boom having a first end pivotally attached to the lower end of the mast, and a second end, the boom having a retracted position and an extended position, that pivots approximately 90 degrees from vertical to horizontal and extends up to and beyond approximately 25 feet; and
- a nozzle assembly attached to the second end of the boom with elevation and traverse capability;
- a plurality of hydraulically actuated cylinders and motors allowing operation in hazardous and explosive environments; and
- a manifold system for the supply/return of working hydraulic fluid utilizing adjustable electro-hydraulic valves, and
- a control station adapted for a human machine interface allowing control of the system up to and beyond approximately 1000 feet away.

11. A hydraulically controlled, programmable railcar tank cleaning system that operates as an independent, standalone unit comprising:
- an upper assembly attached to a tank;
- a mast having an upper end attached to the upper assembly, and a lower end:
- a telescoping boom having a first end pivotally attached to the lower end of the mast, and a second end, the boom having a retracted position and an extended position, that pivots approximately 90 degrees from vertical to horizontal and extends up to and beyond approximately 25 feet; and
- a nozzle assembly attached to the second end of the boom with elevation and traverse capability; and
- a maximum folded body envelope that allows installation through a hole as small as approximately 18 inches in diameter.

12. A hydraulically controlled, programmable railcar tank cleaning system that operates as an independent, standalone unit comprising:
- an upper assembly attached to a tank;
- a mast having an upper end attached to the upper assembly, and a lower end;
- a telescoping boom having a first end pivotally attached to the lower end of the mast, and a second end, the boom having a retracted position and an extended position, that pivots approximately 90 degrees from vertical to horizontal and extends up to and beyond approximately 25 feet; and
- a nozzle assembly attached to the second end of the boom with elevation and traverse capability; and
- a plurality of hose management systems that accommodate axial and radial motion of a control arm.

* * * * *